United States Patent
Ge et al.

(10) Patent No.: US 12,335,333 B2
(45) Date of Patent: Jun. 17, 2025

(54) METHOD FOR DYNAMICALLY TRIGGERING INSTANTIATION OF EDGE APPLICATION SERVER, AND APPARATUS

(71) Applicant: HUAWEI TECHNOLOGIES CO., LTD., Shenzhen (CN)

(72) Inventors: Cuili Ge, Beijing (CN); Zhengguang Ou, Shenzhen (CN); Yanmei Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/192,124

(22) Filed: Mar. 29, 2023

(65) Prior Publication Data

US 2023/0239343 A1  Jul. 27, 2023

Related U.S. Application Data

(63) Continuation of application No. PCT/CN2020/119762, filed on Sep. 30, 2020.

(51) Int. Cl.
  *H04L 67/10* (2022.01)
  *H04L 41/0806* (2022.01)
  *H04L 67/51* (2022.01)

(52) U.S. Cl.
  CPC .......... *H04L 67/10* (2013.01); *H04L 41/0806* (2013.01); *H04L 67/51* (2022.05)

(58) Field of Classification Search
  CPC ....... H04L 47/286; H04L 63/12; H04L 67/51; H04L 67/568; H04L 67/60; H04L 67/62;
  (Continued)

(56) References Cited

U.S. PATENT DOCUMENTS

| | | | |
|---|---|---|---|
| 2019/0045409 A1 | 2/2019 | Rasanen et al. | |
| 2021/0352156 A1* | 11/2021 | Kim | H04W 84/00 |
| 2023/0075258 A1* | 3/2023 | Featherstone | G06F 9/5061 |

FOREIGN PATENT DOCUMENTS

| | | |
|---|---|---|
| CN | 109981316 A | 7/2019 |
| CN | 110198516 A | 9/2019 |

(Continued)

OTHER PUBLICATIONS

A. Boubendir, E. Bertin and N. Simoni, "On-demand, dynamic and at-the-edge VNF deployment model application to Web Real-Time Communications," 2016 12th International Conference on Network and Service Management (CNSM), Montreal, QC, Canada, 2016, pp. 318-323 (Year: 2016).*

(Continued)

*Primary Examiner* — Messeret F Gebre
(74) *Attorney, Agent, or Firm* — HAUPTMAN HAM, LLP

(57) ABSTRACT

This application discloses a method for dynamically triggering instantiation of an edge application server, and an apparatus. The method includes: A first device receives first information, where the first information is for requesting information about an edge application server of a first application, or is for requesting information about a first edge enabler server, where the first edge enabler server is configured to provide information about an edge application server of a first application; and the first device requests, based on the first information, an edge application server management function entity to instantiate the edge application server of the first application. In embodiments of this application, the edge application server is instantiated based on a user requirement, so that dynamic scheduling and flexible use of a resource are improved, and quality of service experience of an edge application is improved.

17 Claims, 19 Drawing Sheets

(58) Field of Classification Search
CPC . H04L 67/5682; H04L 67/10; H04L 65/1063; H04W 8/24; H04W 84/00; H04I 41/0803; H04I 41/0806; H04I 41/0813; H04I 41/0895; H04I 41/5058
See application file for complete search history.

(56) References Cited

FOREIGN PATENT DOCUMENTS

| | | |
|---|---|---|
| CN | 111343092 A | 6/2020 |
| CN | 111629030 A | 9/2020 |
| WO | 2019148188 A1 | 8/2019 |

OTHER PUBLICATIONS

Platania, M., Beraldi, R., Lodi, G., Querzoni, L., & Baldoni, R. (2012). Supporting NGNs core software services: A hybrid architecture and its performance analysis. Journal of Network and Systems Management, 20(2), 181-99. (Year: 2012).*

A. Ksentini and P. A. Frangoudis, "On Extending ETSI MEC to Support LoRa for Efficient IoT Application Deployment at the Edge," in IEEE Communications Standards Magazine, vol. 4, No. 2, pp. 57-63, Jun. 2020. (Year: 2020).*

V. Theodorou and N. Diamantopoulos, "GLT: Edge Gateway ELT for Data-Driven Intelligence Placement," 2019 (Year: 2019).*

Xu, J., Lei, Y., Carver, R., & Kung, D. (2015). A lightweight, static approach to detecting unbounded thread-instantiation loops doi: http://dx.doi.org/10.1109/ICST.2015.7102579 (Year: 2015).*

J. Kogel, S. Wahl, M. Scharf and M. C. Necker, "Load Sharing in a Distributed IMS Architecture, " VTC Spring 20099—IEEE 69th Vehicular Technology Conference, Barcelona, Spain, 2009, pp. 1-6 (Year: 2009).*

3GPP TS 28.552 V16.7.0:"3rd Generation Partnership Project; Technical Specification Group Services and System Aspects;Management and orchestration;5G performance measurements;(Release 16)",Sep. 2020,total 195 pages.

3GPP TS 28.532 V16.5.0:"3rd Generation Partnership Project;Technical Specification Group Services and System Aspects;Management and orchestration; Generic management services;(Release 16)",Sep. 2020,total 246 pages.

3GPP TR 23.758 V0.4.0 (Sep. 2019), 3rd Generation Partnership Project; Technical Specification Group Services and System Aspects; Study on application architecture for enabling Edge Applications;(Release 17), 77 pages.

3GPP TS 23.558 V1.0.0:"3rd Generation Partnership Project;Technical Specification Group Services and System Aspects;Architecture for enabling Edge Applications; (Release 17)",Sep. 2020,total 103 pages.

* cited by examiner

METHOD FOR DYNAMICALLY TRIGGERING INSTANTIATION OF EDGE APPLICATION SERVER, AND APPARATUS

CROSS-REFERENCE TO RELATED APPLICATIONS

This application is a continuation of International Application No. PCT/CN2020/119762, filed on Sep. 30, 2020, the disclosure of which is hereby incorporated by reference in its entirety.

TECHNICAL FIELD

This application relates to the field of communication technologies, and in particular, to a method for dynamically triggering instantiation of an edge application server, and an apparatus.

BACKGROUND

In the early stage, mobile edge computing (mobile edge computing, MEC) means to provide an IT service environment and a cloud computing capability in an edge data network of a radio access network (radio access network, RAN) closest to a mobile terminal of a user. An objective is to further reduce a latency/delay, improve network operation efficiency, improve a service distribution/transmission capability, and optimize/improve terminal user experience. Therefore, "edge (edge)" herein means an edge of a mobile communication network, for example, a local data network connected to a user plane function deployed at a low location. A mobile edge computing infrastructure deployed at the edge of the mobile communication network opens a network capability to various upper-layer applications and services, so that the mobile communication network can provide various services related to a situation.

Later, the European Telecommunications Standards Institute (European Telecommunications Standards Institute, ETSI) redefines the MEC as multi-access edge computing (multi-access edge computing), including a multi-access heterogeneous network that uses technologies such as LTE, 5G, a fixed broadband, and Wi-Fi. After expansion, not only the mobile edge computing is still available, but also an edge application can be coordinately run in the expanded heterogeneous network. For example, when signal coverage of a base station is poor in a stadium or at home, through the multi-access edge computing, an access device can provide a service by using all surrounding devices that can transmit a signal. An access manner such as more base stations, Wi-Fi and Bluetooth nearby, or even another mobile phone nearby is included herein.

In the MEC, a terminal specifically obtains an edge computing service by accessing an edge application server (edge application server, EAS) in an edge data network (edge data network, EDN). In a process of accessing the EAS, the terminal needs to discover, by using an edge enabler server (edge enabler server, EES), information about the to-be-accessed EAS, or needs to obtain or discover, by using an edge configuration server (edge configuration server, ECS), the EDN in which the EAS is located, and access the EAS. In some cases, if an EAS corresponding to a terminal application does not exist at a location requested by the terminal to access, including the EDN in which the EES or the ECS is located, the EES or the ECS indicates, for the terminal, an EAS at another location, so that the terminal accesses the EAS. However, the re-indicated EAS at the another location may not satisfy a requirement of the terminal, and consequently cannot provide high-quality edge service experience for the terminal.

SUMMARY

Embodiments of this application provide a method for dynamically triggering instantiation of an edge application server, and an apparatus, to instantiate the edge application server based on a user requirement, so that quality of service experience of an edge application is improved.

According to a first aspect, a method for dynamically triggering instantiation of an edge application server is provided. The method includes: A first device receives first information, where the first information is for requesting information about an edge application server of a first application, or is for requesting information about a first edge enabler server, where the first edge enabler server is configured to provide information about an edge application server of a first application; and the first device requests, based on the first information, an application instantiation management function entity to instantiate the edge application server of the first application.

In this embodiment of this application, the first device receives the first information sent by a second device. The first information is for requesting the information about the edge application server of the first application, or is for requesting the information about the first edge enabler server, to obtain, from the first edge enabler server, the information about the edge application server of the first application. Then, the first device implements instantiation of the edge application server of the first application based on the first information. In this process, the edge application server is dynamically instantiated based on a user requirement, so that dynamic scheduling and flexible use of a resource are improved, and quality of service experience of an edge application is improved. In addition, in this process, a control plane device triggers the instantiation of the edge application server, so that real-time performance of the instantiation process is improved.

In an optional example, before the first device requests, based on the first information, the application instantiation management function entity to instantiate the edge application server of the first application, the method further includes: The first device determines that the edge application server of the first application is not instantiated.

In an optional example, that the first device requests, based on the first information, an application instantiation management function entity to instantiate the edge application server of the first application includes: The first device requests the application instantiation management function entity to instantiate the edge application server of the first application in an edge data network corresponding to the first device.

In an optional example, that the first device requests, based on the first information, an application instantiation management function entity to instantiate the edge application server of the application includes: The first device requests the application instantiation management function entity to instantiate the edge application server of the first application in an edge data network corresponding to the first edge enabler server.

In an optional example, that the first device requests an application instantiation management function entity to instantiate the edge application server of the application includes: The first device sends requirement information to the application instantiation management function entity, where the requirement information includes at least one of the following: at least one piece of candidate location information, where the candidate location information indicates an edge data network for instantiating the edge application server of the application; or at least one requirement description of the edge application server of the application, where the requirement description includes at least one of the following: deployment mode information, information about a required resource, information about a required key communication indicator, a dependent service or application, or whether context transfer is supported.

In an optional example, the method further includes: The first device receives a notification message from the application instantiation management function entity, where the notification message indicates that the edge application server of the application is instantiated.

In an optional example, the method further includes: The first device receives identifier information of the instantiated edge application server of the application.

In an optional example, the method further includes: The first device sends information about the instantiated edge application server of the application to a second device, where the second device is a device that sends the first information.

According to a second aspect, a method for dynamically triggering instantiation of an edge application server is provided. The method includes: When a first condition or a second condition is satisfied, a first device determines a first edge application server that needs to be instantiated in an edge data network and that is of an application; and the first device requests an application instantiation management function entity to instantiate the first edge application server of the application.

In this embodiment of this application, the first device determines, based on whether the first condition or the second condition is satisfied, whether to request the application instantiation management function entity to instantiate the first edge application server of the application. The first condition and the second condition are both conditions related to user traffic. In other words, the first device triggers instantiation of the edge application server based on a user requirement, so that dynamic scheduling and flexible use of a resource are improved, and quality of service experience of an edge application is improved.

In an optional example, the first condition is at least one of the following: when there is no edge application server of the application in the edge data network, a quantity of times for which the first device receives request information is greater than or equal to a first threshold, where the request information is for requesting information about the edge application server of the application in the edge data network, or is for requesting information about a target edge enabler server, where the target edge enabler server is configured to provide information about the edge application server of the application in the edge data network; when there is no edge application server of the application in the edge data network, recommendation information of the application is obtained from a network data analytics function NWDAF; when there is no edge application server of the application in the edge data network, it is determined that a quantity of times for which an edge application server of a second application requests a service is greater than or equal to a second threshold, where the service needs to be provided by the edge application server of the application; when there is no edge application server of the application in the edge data network, it is determined that a third application needs to depend on a service provided by the edge application server of the application; when there is no edge application server of the application in the edge data network, it is determined that at least one user of the application is about to reach the edge data network; or when there is no edge application server of the application in the edge data network, registration information of an edge enabler server is received, where there is no identifier of the application in the registration information.

In an optional example, the second condition is: when there is a second edge application server of the application in the edge data network, and the second edge application server exceeds a service bearing capability, the second edge application server of the application provides a current edge network service for the application.

In an optional example, that the second edge application server exceeds a service bearing capability includes at least one of the following: a quantity of users served by the second edge application server reaches a third threshold; traffic of users served by the second edge application server reaches a fourth threshold; or a resource consumed by the second edge application server reaches a fifth threshold.

According to a third aspect, a control plane device is provided. The apparatus includes a receiving module, a processing module, and a sending module. The receiving module is configured to receive first information, where the first information is for requesting information about an edge application server of a first application, or is for requesting information about a first edge enabler server, where the first edge enabler server is configured to provide information about an edge application server of a first application; and the processing module is configured to request, with reference to the sending module and based on the first information, an application instantiation management function entity to instantiate the edge application server of the first application.

In an optional example, the processing module is further configured to determine that the edge application server of the first application is not instantiated.

In an optional example, the processing module is further configured to request, with reference to the sending module, the application instantiation management function entity to instantiate the edge application server of the first application in an edge data network corresponding to the first device.

In an optional example, the processing module is further configured to request, with reference to the sending module, the application instantiation management function entity to instantiate the edge application server of the first application in an edge data network corresponding to the first edge enabler server.

In an optional example, the sending module is configured to send requirement information to the application instantiation management function entity, where the requirement information includes at least one of the following: at least one piece of candidate location information, where the candidate location information indicates an edge data network for instantiating the edge application server of the application; or at least one requirement description of the edge application server of the application, where the requirement description includes at least one of the following: deployment mode information, information about a required resource, information about a required key communication indicator, a dependent service or application, or whether context transfer is supported.

In an optional example, the receiving module is further configured to receive a notification message from the application instantiation management function entity, where the notification message indicates that the edge application server of the application is instantiated.

In an optional example, the receiving module is further configured to receive identifier information of the instantiated edge application server of the application.

In an optional example, the sending module is further configured to send information about the instantiated edge application server of the application to a second device, where the second device is a device that sends the first information.

According to a fourth aspect, a control plane device is provided. The apparatus includes a processing module and a sending module. The processing module is configured to: when a first condition or a second condition is satisfied, determine a first edge application server that needs to be instantiated in an edge data network and that is of an application; and the processing module is further configured to request, with reference to the sending module, an application instantiation management function entity to instantiate the first edge application server of the application.

According to a fifth aspect, an embodiment of this application provides a communication apparatus. The apparatus has a function of implementing the terminal in any one of the first aspect or the possible implementations of the first aspect, or has a function of implementing the control plane device in any one of the first aspect or the possible implementations of the second aspect.

The apparatus may be a terminal, or may be a chip included in the terminal. The functions of the communication device may be implemented by hardware, or may be implemented by hardware by executing corresponding software. The hardware or the software includes one or more modules corresponding to the functions.

The apparatus may be a network device, or may be a chip included in the network device. The functions of the communication device may be implemented by hardware, or may be implemented by hardware by executing corresponding software. The hardware or the software includes one or more modules corresponding to the functions.

In a possible design, a structure of the apparatus includes a processing module and a transceiver module. The processing module is configured to support the apparatus to perform the method in any one of the first aspect or the possible implementations of the first aspect, or perform the method in any one of the second aspect or the possible implementations of the second aspect.

In another possible design, a structure of the apparatus includes a processor, and may further include a memory. The processor is coupled to the memory, and may be configured to execute computer program instructions stored in the memory, to enable the apparatus to perform the method in any one of the first aspect or the possible implementations of the first aspect, or perform the method in any one of the second aspect or the possible implementations of the second aspect. Optionally, the apparatus further includes a communication interface, and the processor is coupled to the communication interface. When the apparatus is a network device, the communication interface may be a transceiver or an input/output interface. When the apparatus is a chip included in the network device, the communication interface may be an input/output interface of the chip. Optionally, the transceiver may be a transceiver circuit, and the input/output interface may be an input/output circuit.

According to a sixth aspect, an embodiment of this application provides a chip system. The chip system includes a processor, and the processor is coupled to a memory. The memory is configured to store a program or instructions, and when the program or the instructions are executed by the processor, the chip system is enabled to implement the method in any one of the first aspect or the possible implementations of the first aspect, or perform the method in any one of the second aspect or the possible implementations of the second aspect.

Optionally, the chip system further includes an interface circuit, and the interface circuit is configured to exchange code instructions to the processor.

Optionally, there may be one or more processors in the chip system, and the processor may be implemented by hardware or may be implemented by software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

According to a seventh aspect, an embodiment of this application provides a computer-readable storage medium. The computer-readable storage medium stores a computer program or instructions, and when the computer program or the instructions are executed, a computer is enabled to perform the method in any one of the first aspect or the possible implementations of the first aspect, or perform the method in any one of the second aspect or the possible implementations of the second aspect.

According to an eighth aspect, an embodiment of this application provides a computer program product. When a computer reads and executes the computer program product, the computer is enabled to perform the method in any one of the first aspect or the possible implementations of the first aspect, or perform the method in any one of the second aspect or the possible implementations of the second aspect.

According to a ninth aspect, an embodiment of this application provides a communication system. The communication system includes the foregoing one or more control plane devices. Optionally, the communication system may further include a management plane device, another network device, and/or a terminal.

BRIEF DESCRIPTION OF DRAWINGS

To describe technical solutions in embodiments of this application or in a conventional technology more clearly, the following briefly describes the accompanying drawings used in describing embodiments.

DESCRIPTION OF EMBODIMENTS

In the specification, claims, and accompanying drawings of this application, the terms "first", "second", "third", "fourth" and so on are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

An "embodiment" mentioned in this specification means that a particular feature, structure, or characteristic described with reference to this embodiment may be included in at least one embodiment of this application. The phrase shown in various locations in the specification may not necessarily refer to a same embodiment, and is not an independent or optional embodiment exclusive from another embodiment. It is explicitly and implicitly understood by a person skilled in the art that embodiments described in the specification may be combined with another embodiment.

"Multiple" refers to two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

The following describes devices in embodiments of this application with reference to the accompanying drawings.

Figure 1A:
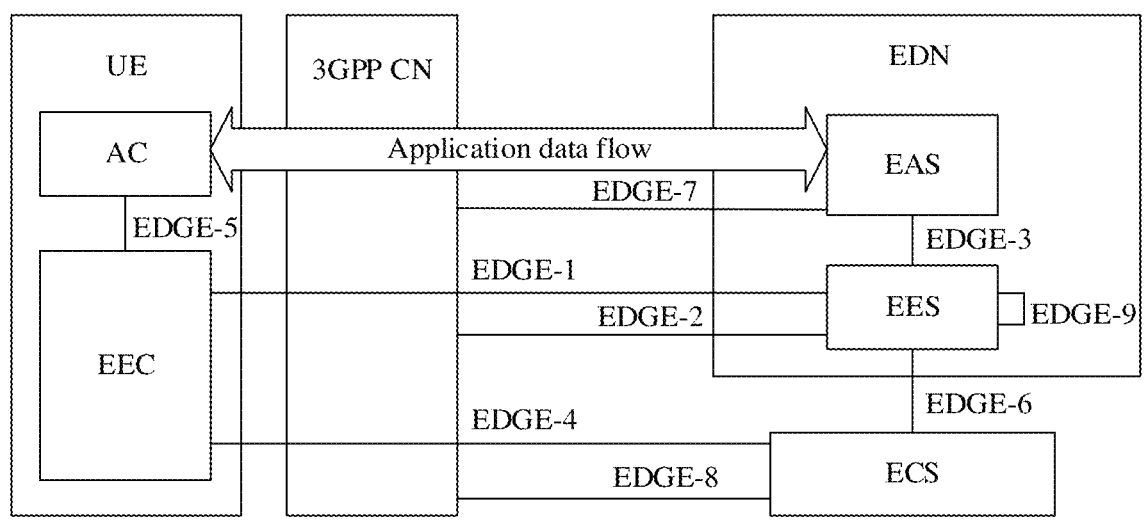
FIG. 1A is a schematic diagram of an MEC architecture according to an embodiment of this application.

A specific scenario in embodiments of this application is an MEC scenario. FIG. 1A is a schematic diagram of an MEC architecture according to an embodiment of this application. As shown in FIG. 1A, the architecture includes user equipment (user equipment, UE), an EDN, and an ECS. The UE includes an application client (application clients, AC) and an EEC. The EDN includes an edge application server (edge application server, EAS) and an EES. The UE and the EDN are connected through a 3GPP core network (3GPP core network, 3GPP CN).

Multi-access edge computing (MEC) allows an application user to access a required service and a cloud computing function nearby, to create a carrier-grade service environment with high performance, a low latency, and a high bandwidth, accelerate quick download of content, a service, and an application in a network, and enable a consumer to enjoy continuous high-quality network experience.

Local DN/Local data network: an access point (access point) of a data network that is close to an attachment point (attachment point) of a user.

Data network: a serving network of an operator or a third party, which can provide a service for UE, for example, an operator service or an Internet service.

Edge data network EDN: A general understanding is as follows: An EDN corresponds to only one data network, is a special local data network (local DN), includes an edge enabler function, may be identified by using a data network access identifier (DN Access Identifier, DNAI) and a data network name (data network name, DNN), and is a network logical concept. In another understanding of the EDN, the EDN is a peer concept of a central cloud. The EDN can be understood as a local data center (which is a geographical location concept), can be identified by using a DNAI, and may include a plurality of local data networks (local DNs).

Application instance/Edge application: An application deployed in an edge data network is referred to as an application instance, and is specifically an instance (instance) that is of a server application (for example, social media software, augmented reality (augmented reality, AR), or virtual reality (virtual reality, VR)) and that is deployed and runs in the EDN. One or more EASs may be deployed for an application in one or more EDNs. The EASs that are deployed and run in the different EDNs may be considered as different EASs of the application. The EASs can share one domain name, use one anycast IP address, or use different IP addresses. The EAS may also be referred to as an edge application (server), an application instance, an edge application instance, an MEC application (server), an EAS function, or the like.

Application client AC: a peer entity of an edge application on a UE side. The application client is used by an application user to obtain an application service from an application server. The application client is a client program of an application on a terminal side. The application client may be connected to an application server on a cloud to obtain an application service, or may be connected to an EAS that is deployed and runs in one or more EDNs to obtain an application service.

Edge enabler server EES: The edge enabler server may provide some enabling capabilities for an application instance deployed in an EDN, to better support application deployment in MEC. The EES may support registration of an edge application, authentication and authorization for UE, provide IP address information of the application instances for the UE, and the like. The EES may further support obtaining an identifier and the IP address information of the application instance, and further send the identifier and the IP address information of the application instance to an edge data network configuration server. The EES is deployed in the EDN. Generally, an EAS is registered with an EES, or information about an EAS is configured on an EES by using a management system. The EES is referred to as an EES associated with the EAS. The EES controls/manages the EAS registered with/configured on the EES. The edge enabler server may provide an enabler service API for the EAS, and the EAS may invoke the service API provided by the edge enabler server. The API may be EAS registration, a UE location, application context transfer, or the like.

Edge enabler client EEC: a peer entity of an EES on a UE side. The EEC is configured to register information about the EEC and information about an application client with the EES, perform security authorization and authentication, obtain an EAS IP address from the EES, and provide an edge computing enabler capability for the application client. For example, the EEC uses an EAS discovery service to return the EAS IP address to the application client.

Edge configuration server ECS: The edge configuration server configures an EDN, for example, provides EES information for UE. The ECS may further directly provide information about an application instance for the UE, and interact with a domain name resolution system (Domain Name System, DNS) of an application to obtain the information about the application instance. Further, information about the application instance and an IP address is obtained from another functional entity and stored. In a current standard, a function of the ECS is integrated into an EEC entity. In other words, the EEC has functions of the EEC and the ECS.

An application user signs a service agreement with a provider of an application, so that a service is provided for the application user. The application user logs in to an application client on a terminal, and performs communication by using a connection between the application client and an EAS. An edge enabler client is a middle layer, and is generally located in an operating system, or is located between the application client and the operating system. The application client may obtain an edge enabler service from the edge enabler client through an application programming interface (application programming interface, API).

Application context: The application context is running status information related to one user or a group of users, and optionally may further include a context subscribed by the one or more users in a source EAS and a core network, for example, a subscribed transaction identifier. Optionally, the application context further includes a context of the one or more users in an EES, for example, a transaction identifier subscribed by the source EAS for the one or more users.

Application context transfer: In a running process of an edge application, when UE moves out of a current service area, for example, the UE moves between EDNs or the UE moves between local area data networks (local area data networks, LADNs), an edge application server that currently provides a service may not continue to provide the service for the currently running application, or an edge application server that currently provides a service is no longer an optimal application server that can provide the service for the UE, another edge application server may be more suitable for serving an application client on the UE, and a new edge application server is selected to serve the UE. Therefore, the new edge application server needs to be used to replace the currently serving edge application server. In this process, an application service is temporarily suspended or interrupted, and an application context needs to be transferred to the new EAS, to ensure that impact of application running interruption is minimized.

Figure 1B:
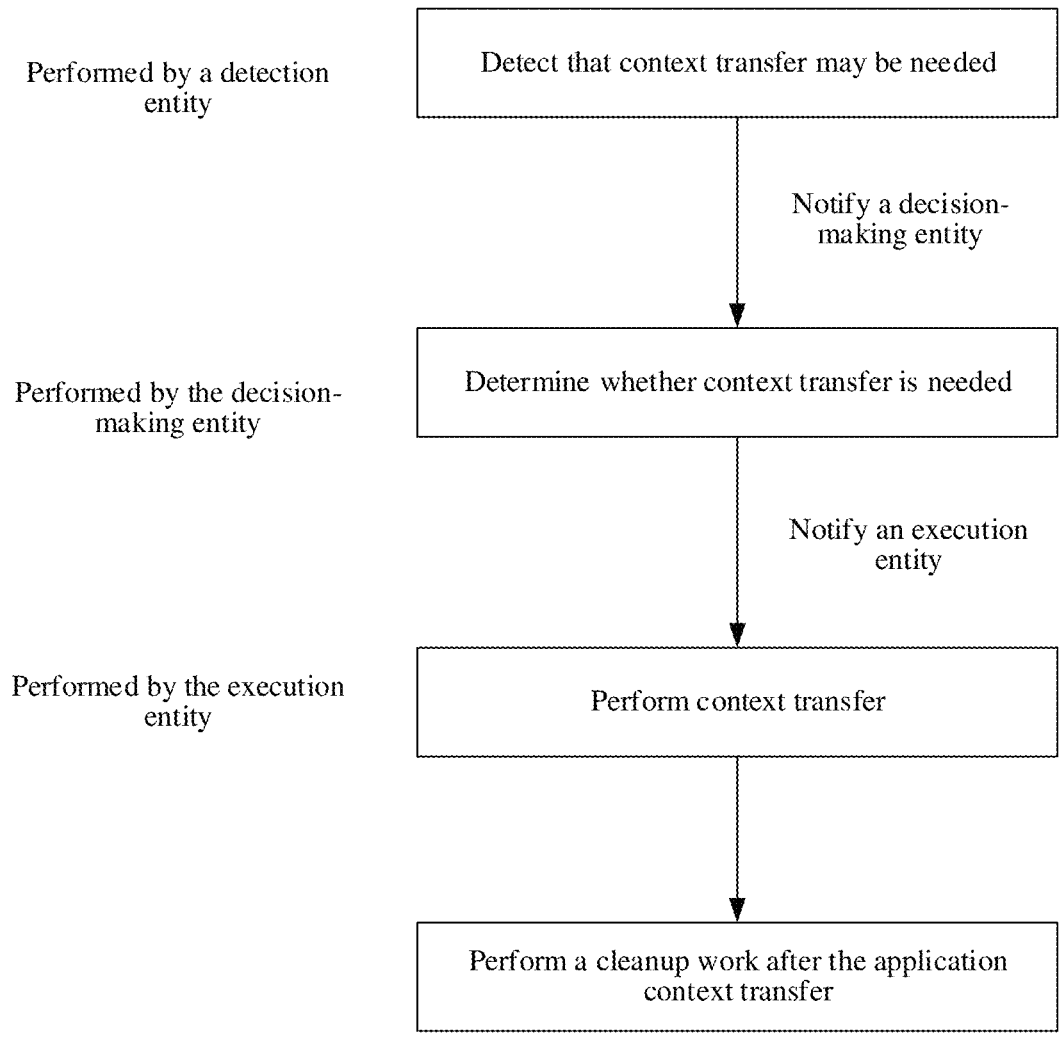
FIG. 1B is a schematic diagram of an application context transfer framework according to an embodiment of this application.

For an application context transfer framework based on the foregoing MEC architecture, refer to FIG. 1B. FIG. 1B is a schematic diagram of an application context transfer framework according to an embodiment of this application. As shown in FIG. 1B, the application context transfer may be mainly divided into four phases: (1) Application context transfer detection: To be specific, it is determined that the context transfer may be needed. In this case, some events, for example, a UE location change or a UE user plane path update, are detected mostly by using a detection question. (2) Decision on the application context transfer: A decision-making entity determines that the context transfer is needed. (3) Execution of the application context transfer: This phase mainly includes transferring an application context from a source EAS to a target EAS, and may further include notifying a terminal of information about the target EAS, and notifying the terminal that network context transfer is completed, and of related information of the target EAS (for example, an address of the target EAS or N6 routing information corresponding to the target EAS). (4) Cleanup work after the application context transfer: A plurality of entities are related, where for example, an application client initiates a new interface connection to the target EAS.

Figure 1C:
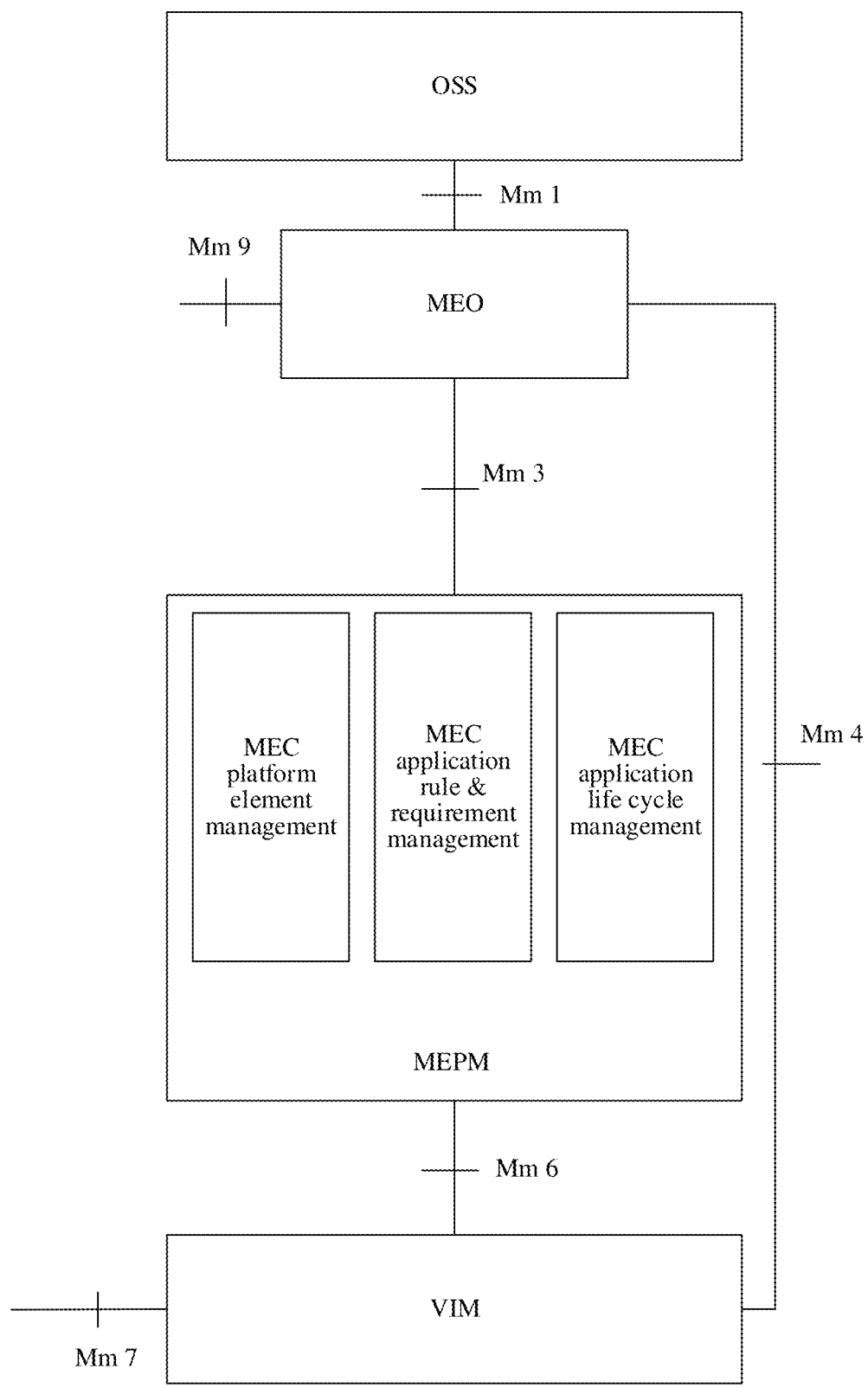
FIG. 1C is a schematic diagram of a structure of instantiation of an edge application server according to an embodiment of this application.
Figure 1D:
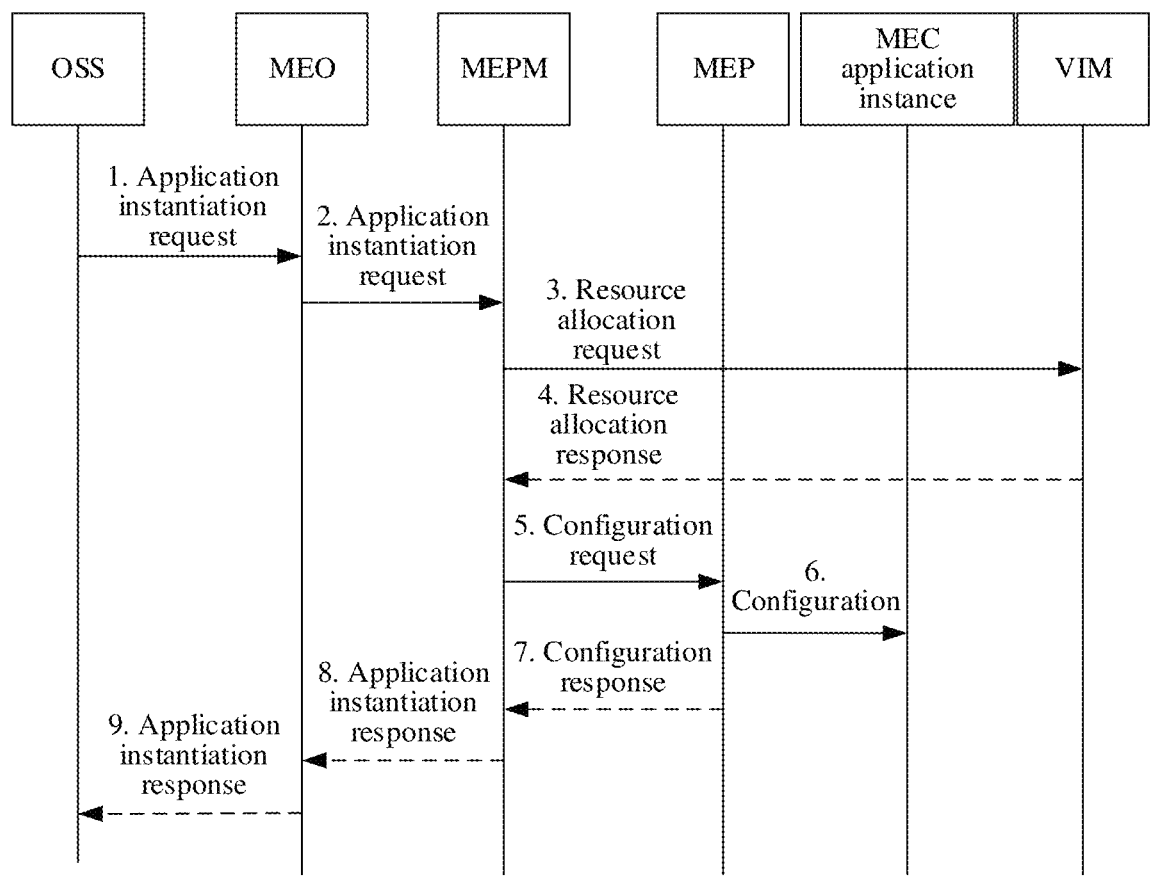
FIG. 1D is a flowchart of instantiation of an edge application server according to an embodiment of this application.

Before an application user requests a service of an EAS, an edge application service management function entity first needs to instantiate the EAS, to be specific, deploy an EAS in an EDN to provide a service for a user application. The edge application service management function entity may be an ETSI MEC management system. The management system includes devices such as an operations support system (operations support system, OSS), a multi-access edge orchestrator (multi-access edge orchestrator, MEO), and an MEC platform management program (MEC platform manager, MEPM). Alternatively, the edge application service management function entity may be a global resource management function device of a public cloud or a distributed resource management function device of a public cloud. An example in which the edge application management function entity is the ETSI MEC management system is used for description. FIG. 1C is a schematic diagram of a structure of instantiation of an edge application server according to an embodiment of this application. As shown in FIG. 1C, main function entities that may be included in an ETSI MEC management system are an OSS, an MEO, MEC, and a VIM. Main related interfaces are Mm 1, Mm 3, Mm 4, and Mm 6. Further, FIG. 1D is a flowchart of instantiation of an edge application server according to an embodiment of this application. As shown in FIG. 1D, an instantiation procedure of an edge application server in this architecture includes the following steps.

1. An OSS sends an application instantiation request to a multi-access edge orchestrator MEO, where the request carries an application description identifier (which points to one piece of application description information), an application instance name, and description information (which is description information that can be read by a human).
2. The MEO checks configuration information and data of an application instance and performs authorization check. The MEO selects an MEC site (MEC host, MEP) and sends an application instantiation request to an MEPM corresponding to the MEP. If a resource corresponding to the MEP is insufficient, the MEO further determines whether to preempt a resource of another MEC application that has been instantiated in the MEP, to ensure that the resource for application instantiation is sufficient.
3. The MEPM sends a resource allocation request to a VIM, where the request includes a required resource, including a computing resource, a storage resource, or a network resource. The MEP includes an application image (for example, an image URL or ID) in the request.
4. A virtualized infrastructure management program (virtualized infrastructure manager, VIM) allocates a resource based on the request. If the request includes the application image, a VIM application image is loaded to a virtual machine. The VIM sends a resource allocation request message to the MEPM.
5. The MEPM sends a configuration request to the MEP, where the request includes a traffic (traffic) rule, a DNS rule, a required service, and a service provided by the application.
6. The MEP configures a traffic rule and a DNS rule of the application instance. The MEP needs to wait until the application instance can run normally, to activate the foregoing rules. After the application instance runs normally, the MEP provides an available service for the application.
7. The MEP sends a configuration response to the MEPM.
8. The MEPM sends an application instantiation response to the MEO, where the response message includes information AppinstanceInfo about a resource allocated to the application instance.
9. The MEO sends an application instantiation response to the OSS, where the response message includes an instantiation result (which is a success or a failure) and an identifier of the application instance.

For an instantiated EAS, the user may discover and access the EAS. An EAS discovery process provides discovery of an EES platform and discovery of an application instance at an application layer. The EES may be understood as a local DNS server. After discovering the EES platform, UE obtains an address of the application instance from the platform. A two-level discovery mechanism is designed and used for an architecture and a function. The EES platform is discovered first, and then the EAS is discovered from the EES platform. The process includes the following steps: Step 1: An EEC on a terminal side discovers an EES platform from an ECS. The following is specifically included. 1a: The EEC requests/subscribes to a platform EES corresponding to a UE location (and/or a requested application) from the ECS, and the EEC discovers, from the ECS, an EES in which the EEC is interested. 1b: The ECS has configuration information of the EES, where the configuration information includes an identifier of the EES, an access address of the EES, a service area of the EES, a DNAI corresponding to the EES, an identifier of an application registered in the EES, and the like. The ECS may select a suitable EES for each application based on the UE location or based on a further obtained DNAI corresponding to the UE, and with reference to the UE location or the DNAI, an identifier of the requested application or an identifier of an application associated with the UE, and EES information (profile). A plurality of applications may correspond to a same EES, and the ECS may alternatively select the EES with reference to other optional filtering information. 1c: Obtain a current/potential DNAI. 1d: The EEC obtains information about one or more EESs from the ECS. Step 2: The EEC discovers an EAS application instance from the EES. The following is specifically included. 2a: The EEC discovers a to-be-accessed application from the EES. 2b: The EES matches information about a registered application. The EES matches, based on information about a locally registered or an online edge application instance and an EAS discovery filtering parameter provided by the user, an edge application instance that satisfies a user request. If a plurality of edge application instances satisfy the user request, the plurality of edge application instances may be returned, or the EES selects one EAS from the edge application instances and returns the EAS. 2c: The EES returns information about an EAS to the EEC. Further, the EEC may provide the information about the EAS to an application client, where the client is connected to the edge application instance by using the information.

In the foregoing process, when there is no application requested by the UE in the EES matching the UE location or in the EES at the location of the application requested by the UE (the EAS of the application is not deployed in the EES), the ECS selects an EES at another location that is farther away from the UE location or the location of the application requested by the UE, and the EAS of the application is deployed in the EES. Alternatively, a request of the UE is directly rejected. As a result, the request of the UE fails, or the accessed application is not at an optimal location.

In addition, in a process of instantiation of an application (in other words, instantiation of an edge application server of the application), an application instance is instantiated by an application developer/application service provider (application service provider, ASP) by using a management system before UE accesses an EAS, and a dynamic transfer requirement of the UE may not be satisfied.

Figure 2A:
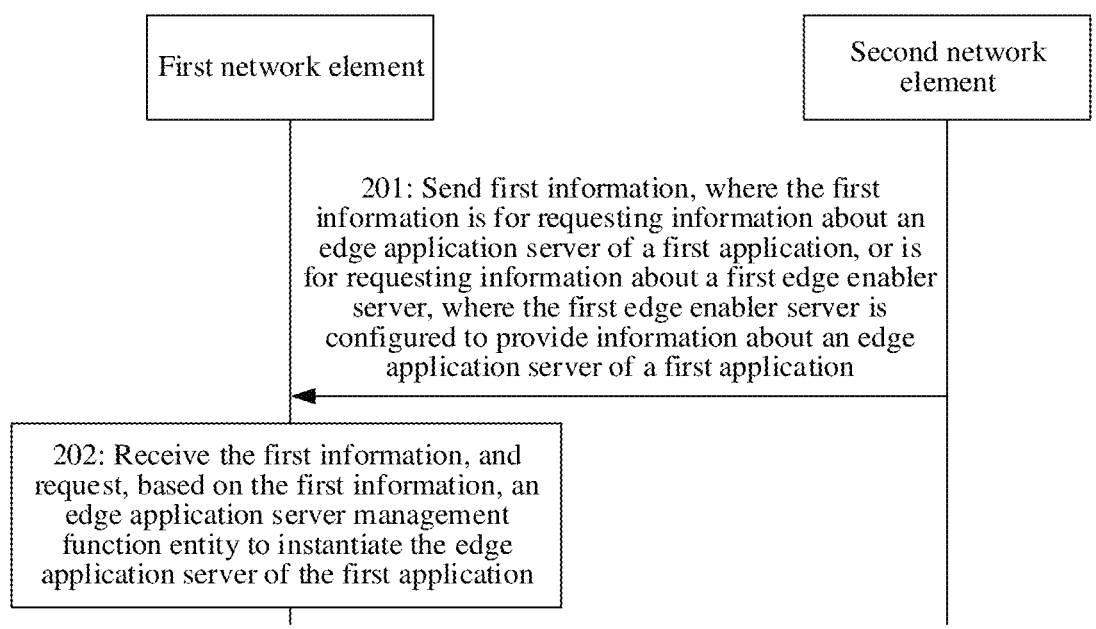
FIG. 2A is a flowchart of a method for dynamically triggering instantiation of an edge application server according to an embodiment of this application.

Based on the foregoing problems, FIG. 2A is a flowchart of a method for dynamically triggering instantiation of an edge application server according to an embodiment of this application. As shown in FIG. 2A, the method includes the following steps.

201: A second device sends first information to a first device, where the first information is for requesting information about an edge application server of a first application, or is for requesting information about a first edge enabler server, where the first edge enabler server is configured to provide information about an edge application server of a first application.

202: The first device receives the first information, and requests, based on the first information, an application instantiation management function entity to instantiate the edge application server of the first application.

Applications deployed in an edge data network may be classified into two types, namely, an application based on single-user deployment, or an application based on multi-user deployment. The application based on single-user deployment means that an edge application server instance serves only one user. Usually, an edge application server instance of the application moves along with the user. For example, when a user requests an edge application server that is of an application A and that is at a specific location (or it is understood as that the user requests, at the specific location, the edge application server of the application A), the edge application server of the application A serves the user at the location (an EDN in which the corresponding edge application server is located). When a location of the user moves, there is no edge application server of the application A that can serve the user when the user arrives at a new location. When the user arrives at the new location, a new edge application server of the application A is created (which may be understood as instantiation) to serve the user. The application based on multi-user deployment means that one edge application server instance may serve a plurality of users of the application. An edge application server of this type of application is usually instantiated before the $1^{st}$ user arrives, and may serve any user of the application at any time. For example, when a user requests an application B at a specific location, an edge application server of the application B at the location serves the user. When a location of the user moves, the user needs to request a service of the application B at a new location. In this case, the edge application server of the application B may not exist at the new location. For example, the location may be a non-hotspot area, and no edge application server of the application B is deployed herein by the application B. In the foregoing two cases, if there is no target application (the application A or the application B) at the location requested by the user, a discovery request of the user for the target application fails, or a server that is of the target application of the user and that is at a far edge or even cloud is selected.

In this embodiment of this application, an instantiation method of the application based on single-user deployment is specifically described.

For the application based on single-user deployment, because a user may open or close the application at any time, an EAS of the application may be dynamically opened or closed, or even dynamically instantiated. In this embodiment of this application, the second device sends the first information to the first device. The first information is for requesting the information about the edge application server of the first application, or is for requesting the information about the first edge enabler server, to further obtain, from the first edge enabler server, the information about the edge application server of the first application. The first device receives the first information, and requests, based on the first information, the application instantiation management function entity to instantiate the edge application server of the application. In this process, the second device may be a terminal (or an EEC, which is the same below), and the first device may be an EES. To be specific, the terminal requests the platform EES to obtain the information about the EAS of the first application, and the platform EES triggers an edge application server management function entity to instantiate an EAS of the first application. Alternatively, the second device may be an EES, and the first device may be an ECS. To be specific, the source EES requests to obtain information about a first EES from the ECS. The source EES is a platform EES that originally provides the information about the EAS of the first application for a terminal, and the first EES is a platform EES that provides the information about the EAS of the first application for the terminal after the terminal moves. In some cases, when the ECS determines that the first EES does not include the information about the EAS of the first application, the ECS triggers the application instantiation management function entity to instantiate an EAS of the first application. Alternatively, the second device may be a terminal, and the first device may be an ECS. To be specific, the terminal requests to obtain a first EES from the ECS. In some cases, the ECS determines that the first EES does not include the information about the EAS of the first application, and the ECS triggers the application instantiation management function entity to instantiate an EAS of the first application. Alternatively, the second device may be a terminal, and the first device may be a public cloud service management entity. To be specific, the terminal requests to obtain an EAS of the first application from the public cloud service management entity, and the application instantiation management function entity instantiates the EAS of the first application.

In the foregoing process, the first device triggers the application instantiation management function entity to instantiate the EAS of the first application. The application instantiation management function entity may be the edge application service management function entity described in the foregoing content, or may be a part of function devices in the entity. To be specific, the edge application service management function entity can instantiate an EAS of an application in advance, and can also dynamically trigger, based on information sent by a control plane device, instantiation of the EAS of the application. Alternatively, the application instantiation management function entity is an independent function device, and is configured to support dynamically triggering instantiation of the EAS of the application. The application instantiation management function entity may be a function entity such as an MEO or an MEPM, a global resource management function device of a public cloud, or a distributed resource management function device of a public cloud. The foregoing described process of dynamically triggering instantiation of the EAS corresponds to the following application scenarios.

Scenario 1: Combination with an ETSI MEC Management System—a Scenario in which a Terminal Initially Discovers an EAS.

Figure 2B:
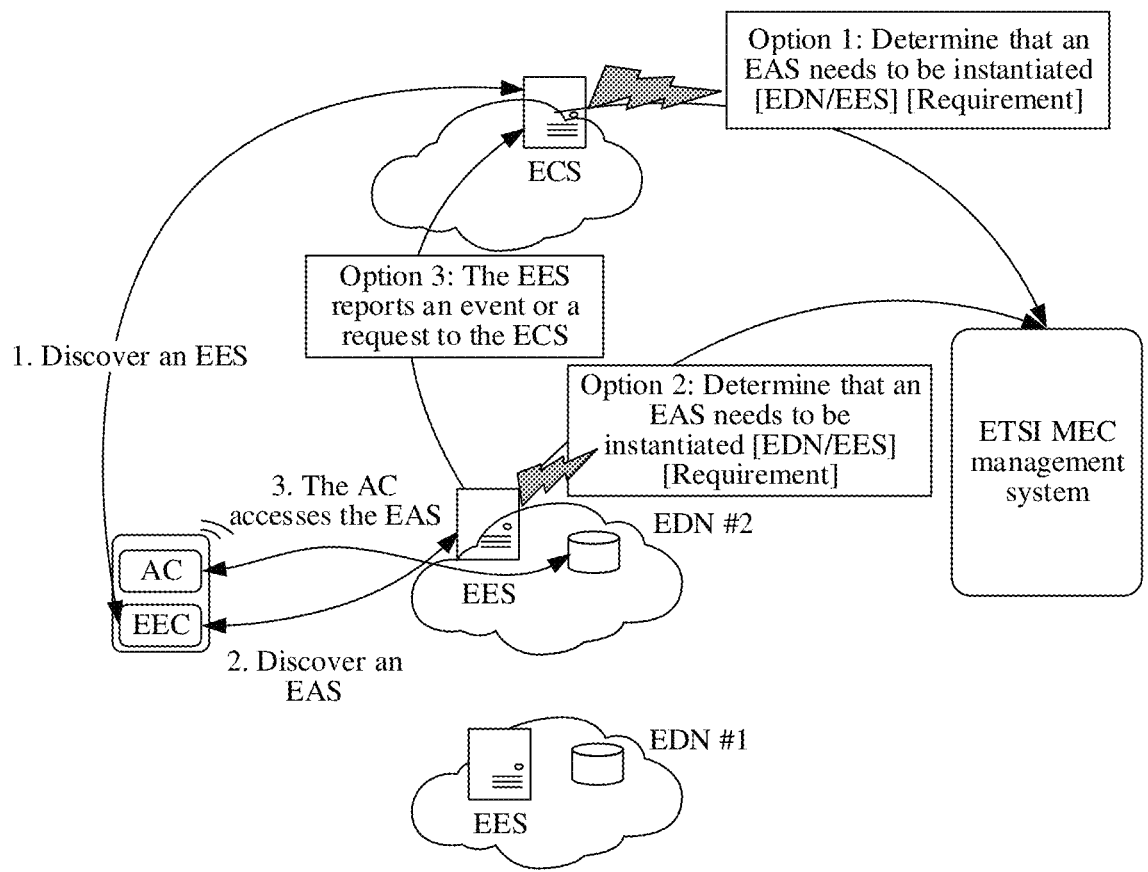
FIG. 2B is a schematic diagram of a scenario in which an initial discovery of an EAS triggers instantiation of the EAS according to an embodiment of this application.

FIG. 2B is a schematic diagram of a scenario in which an initial discovery of an EAS triggers instantiation of the EAS according to an embodiment of this application. As shown in FIG. 2B, the initial discovery of the EAS is a process in which a terminal discovers the EAS and performs access when the terminal is not connected to the EAS. In this process, a function of an application management entity is implemented by an ETSI MEC management system, that is, the ETSI MEC management system is triggered based on a user requirement to implement instantiation of the EAS. A process of discovering an EAS includes the following steps: 1. A terminal (which may be specifically an EEC in the terminal) requests an ECS, to discover a platform EES. In this case, as shown in Option 1, the ECS may determine that an EAS needs to be instantiated, and trigger interaction with a device (for example, an MEO or an MEPM) in an ETSI MEC management system to instantiate the EAS. Interaction information may include location information such as EDN information or EES information, and application requirement information. 2. The terminal requests the EES, to discover the EAS. When Option 1 is not executed, Option 2 may be executed. To be specific, the EES determines that an EAS needs to be instantiated, and triggers interaction with a device (for example, an MEO or an MEPM) in an ETSI MEC management system to instantiate the EAS. Alternatively, the EES may execute Option 3. To be specific, the EES reports an EAS non-existence event or an EAS instantiation request to the ECS, to notify the ECS that an EAS needs to be instantiated. Then, the ECS executes Option 1. 3. After discovering the EAS, the terminal (which may be specifically an AC in the terminal) requests to access the EAS.

Scenario 2: Combination with an ETSI MEC Management System—a Scenario in which Application Context Transfer is Caused by a Terminal Movement.

Figure 2C:
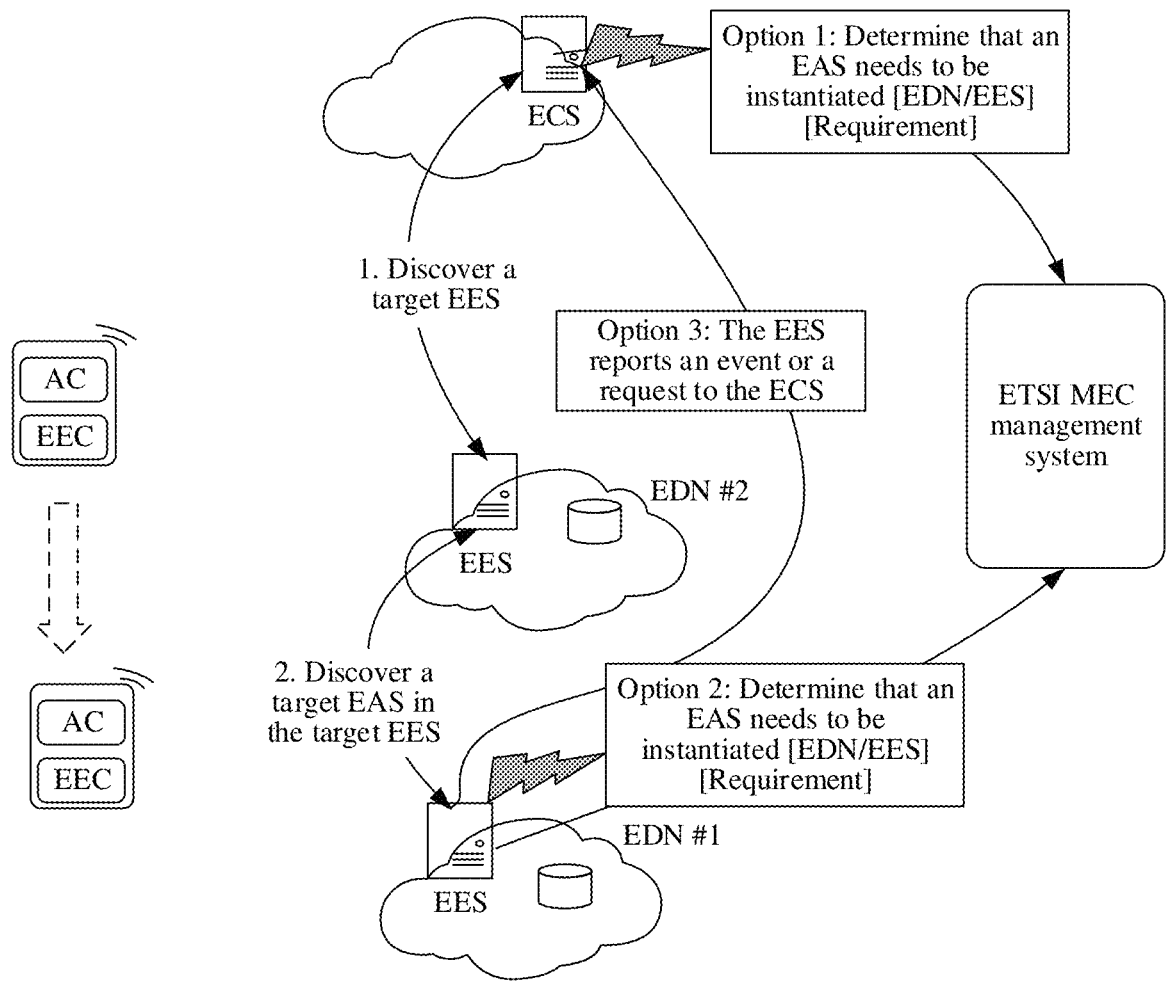
FIG. 2C is a schematic diagram of a scenario in which a context transfer discovery of an EAS triggers instantiation of the EAS according to an embodiment of this application.

FIG. 2C is a schematic diagram of a scenario in which a context transfer discovery of an EAS triggers instantiation of the EAS according to an embodiment of this application. As shown in FIG. 2C, in this scenario, a function of an application management entity is implemented by an ETSI MEC management system. A terminal moves from a location 1 to a location 2. As a result, the terminal cannot obtain a service from an original EAS, or an original EAS is no longer an optimal EAS that serves the UE. An application client on the terminal may be suspended or interrupted briefly, an application context is transferred to a new EAS, and then the terminal (which is specifically an AC in the terminal) requests to access the new EAS. Specifically, the following steps are included. 1. A source platform EES (which is an EES that originally provides the information about the EAS for the terminal) requests the ECS, to discover a target platform EES (that is, a new platform EES to which the application context is transferred). In this process, the ECS may execute Option 1. 2. The source platform EES requests the target platform EES, to discover a target EAS to which the application context is transferred. When the ECS does not execute Option 1, the EES may execute Option 2, or the EES may execute Option 3, to trigger the ECS to execute Option 1. 3. The terminal accesses the target EAS.

In the foregoing process, an entity for instantiating the EAS is an ETSI MEC management system. In some cases, the entity for instantiating the EAS may alternatively be a public cloud management system.

Scenario 3: Combination with a Public Cloud/Edge Cloud Resource Management Function Entity—a Scenario in which a Terminal Initially Discovers an EAS.

Figure 2D:
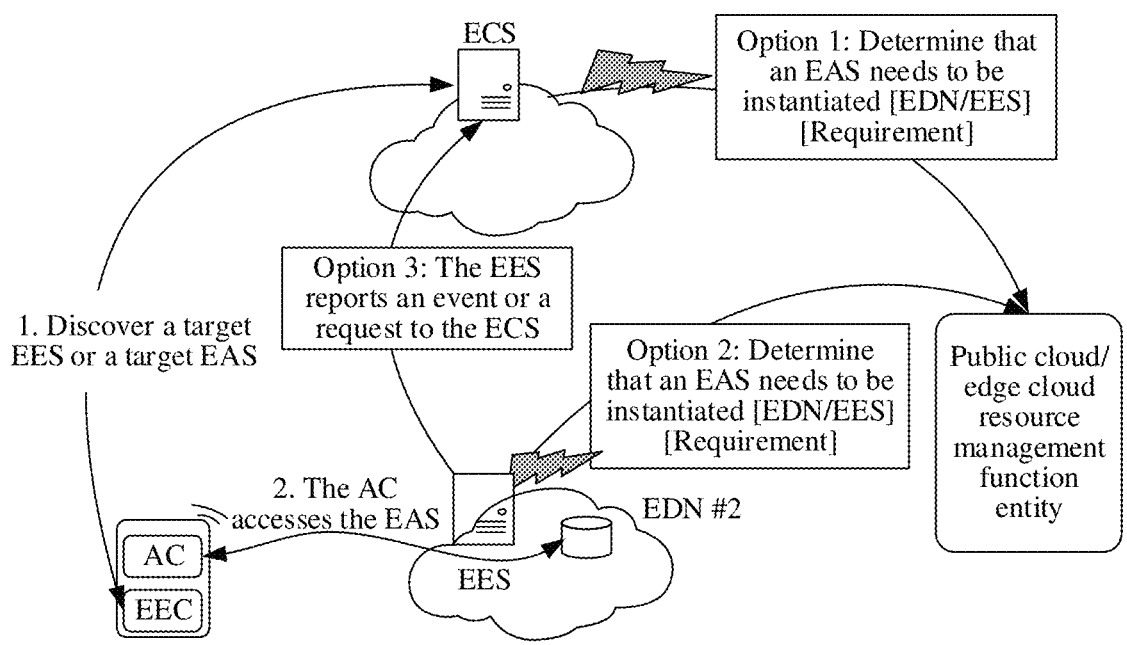
FIG. 2D is a schematic diagram of a scenario in which an initial discovery of an EAS triggers instantiation of the EAS according to an embodiment of this application.

FIG. 2D is a schematic diagram of a scenario in which an initial discovery of an EAS triggers instantiation of the EAS according to an embodiment of this application. As shown in FIG. 2D, in this scenario, a function of an application management entity is implemented by a public cloud/edge cloud resource management function entity. A process of discovering an EAS includes the following steps. 1. A terminal requests an ECS, to discover a platform EES. In this case, as shown in Option 1, the ECS may determine that an EAS needs to be started, and trigger the public cloud/edge cloud resource management function entity to start the EAS. Trigger information may include location information such as EDN information or EES information, and application instantiation requirement information. 2. The terminal requests the EES, to discover the EAS. When Option 1 is not executed, Option 2 may be executed. To be specific, the EES determines that an EAS needs to be started, and triggers the public cloud/edge cloud resource management function entity to start the EAS. Alternatively, the EES may execute Option 3. To be specific, the EES reports an event that the EAS is not instantiated or an EAS instantiation request to the ECS, to notify the ECS that an EAS needs to be instantiated, and then the ECS executes option 1. 3. After discovering the EAS, the terminal (which may be specifically an AC in the terminal) requests to access the EAS.

Scenario 4: Combination with a Public Cloud/Edge Cloud Resource Management Function Entity—a Scenario in which Application Context Transfer is Caused by a Terminal Movement.

Figure 2E:
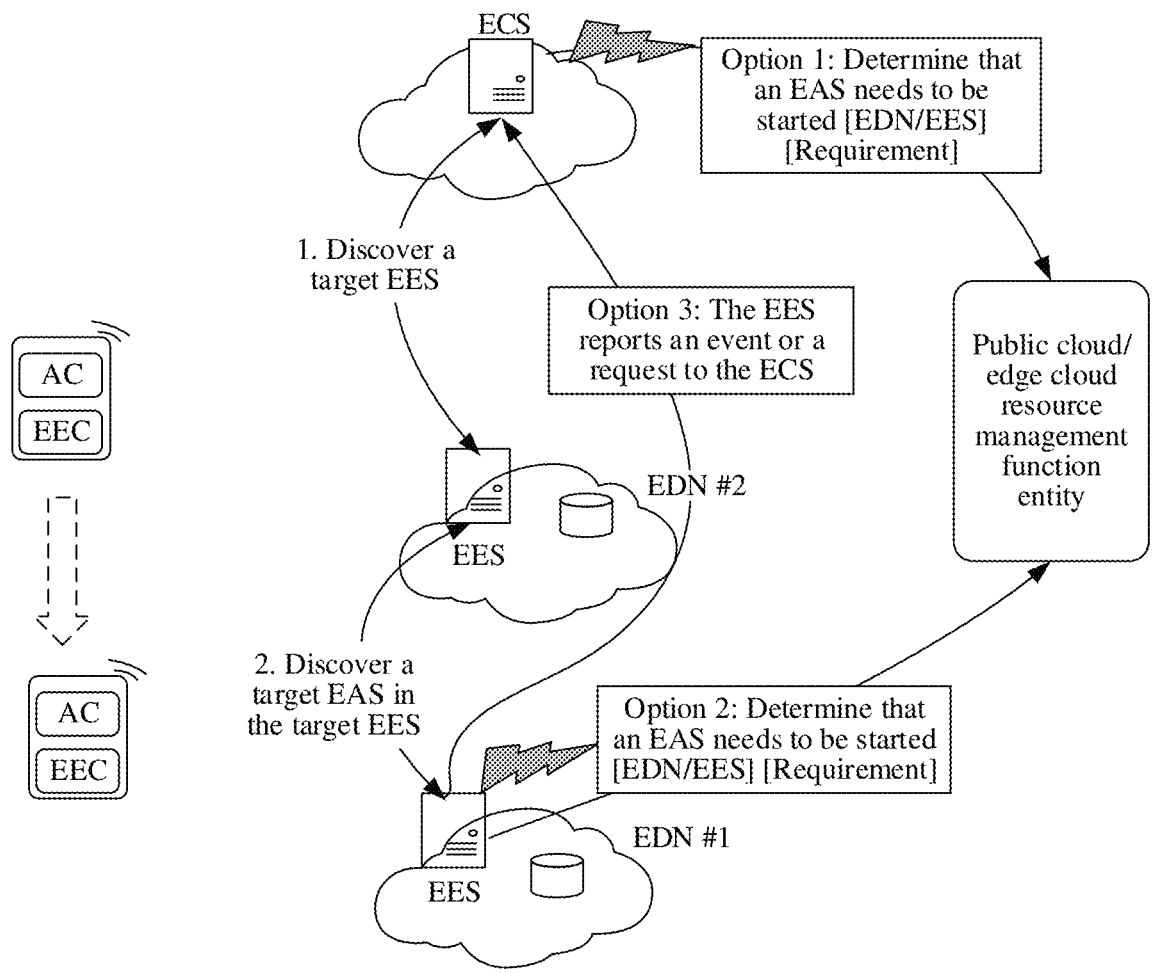
FIG. 2E is a schematic diagram of a scenario in which an application context transfer discovery of an EAS triggers instantiation of the EAS according to an embodiment of this application.

FIG. 2E is a schematic diagram of a scenario in which an application context transfer discovery of an EAS triggers instantiation of the EAS according to an embodiment of this application. As shown in FIG. 2E, in this scenario, a function of an application management entity is implemented by a public cloud/edge cloud resource management function entity. A process of discovering an EAS includes the following steps. A source EES platform discovers a target platform EES (in other words, a new platform EES to which an application context is to be transferred) from an ECS. In this process, an ECS entity may execute Option 1. 2. The source EES platform requests the target platform EES, to discover a target EAS to which the application context is transferred. When the ECS does not execute Option 1, the EES may execute Option 2, or the EES may execute Option 3, to trigger the ECS to execute Option 1. 3. After discovering the EAS, the terminal accesses the target EAS.

Optionally, a control plane device (an ECS) may alternatively be implemented by a public cloud/edge cloud resource management function entity. A corresponding scenario is as follows.

Scenario 5: In Edge-Cloud Synergy, a Terminal Discovers an EAS Through a Public Cloud/Edge Cloud Central Node.

Figure 2F:
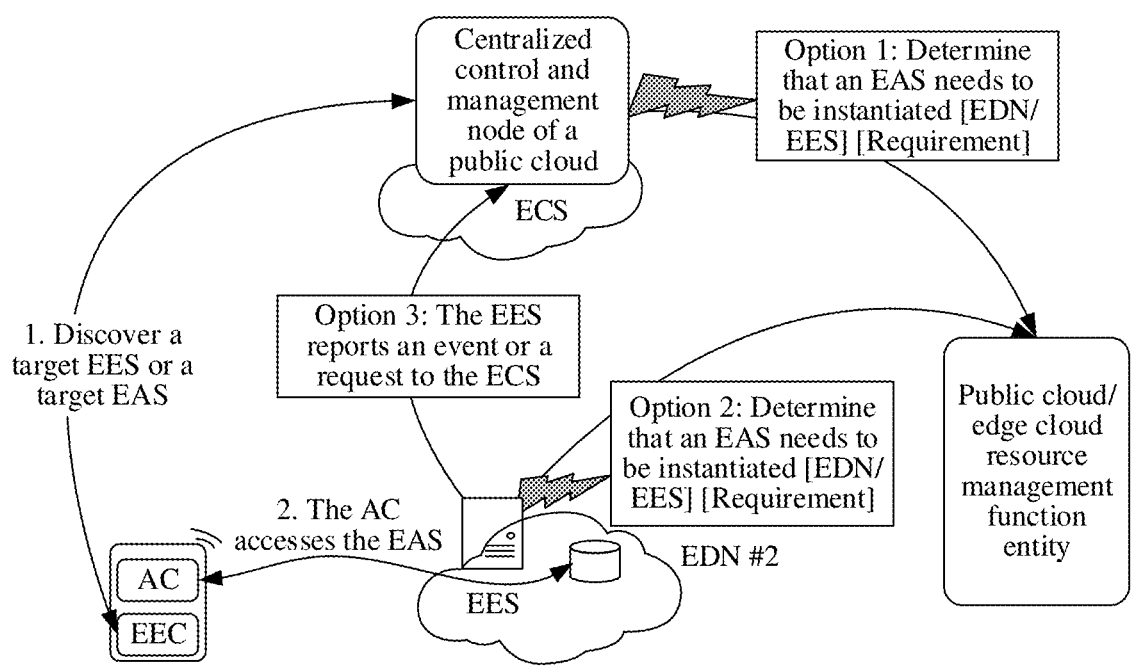
FIG. 2F is a schematic diagram of a scenario in which a terminal discovers an EAS and triggers instantiation of the EAS according to an embodiment of this application.

FIG. 2F is a schematic diagram of a scenario in which instantiation of an EAS is triggered when a terminal initially discovers the EAS or the EAS is discovered during application context transfer according to an embodiment of this application. As shown in FIG. 2F, in a public cloud system, a platform EES and an EAS are managed by a public cloud/edge cloud resource management function entity, and a function of an application management entity is implemented by the public cloud/edge cloud resource management function entity. A process in which the terminal discovers the EAS includes the following steps. 1. The terminal requests a centralized control and management node of a public cloud, to discover the EAS. Optionally, that the terminal discovers an EES corresponding to the EAS is further implicitly included. In this case, as shown in Option 1, when the centralized control and management node of the public cloud determines that an EAS needs to be instantiated, the centralized control and management node of the public cloud instantiates the EAS, or the centralized control and management node of the public cloud triggers an edge cloud resource management function to instantiate the EAS. The centralized control and management node of the public cloud or the edge cloud resource management function may instantiate the EAS based on location information such as EDN information or EES information, and application instantiation requirement information. 2. After discovering the EAS, the terminal (which may be specifically an AC in the terminal) requests to access the EAS. In an application context transfer process, the centralized control and management node of the public cloud determines, based on a user location or a load status of an EAS that currently serves a user, that an EAS needs to be instantiated. In this case, the centralized control and management node of the public cloud determines that an EAS needs to be instantiated to perform Option 1.

The foregoing scenarios are merely examples of some scenarios. The method in this embodiment of this application may alternatively be applied to another scenario. This is not limited herein.

It can be learned that, in this embodiment of this application, the first device receives the first information sent by a second device. The first information is for requesting the information about the edge application server of the first application, or is for requesting the information about the first edge enabler server, to obtain, from the first edge enabler server, the information about the edge application server of the first application. Then, the first device implements instantiation of the edge application server of the first application based on the first information. In this process, the edge application server is dynamically instantiated based on a user requirement, so that dynamic scheduling and flexible use of a resource are improved, and quality of service experience of an edge application is improved. In addition, in this process, a control plane device triggers the instantiation of the edge application server, so that real-time performance of the instantiation process is improved.

The following describes a specific implementation process of this method for different first devices, different second devices, and different application scenarios.

Figure 2G:
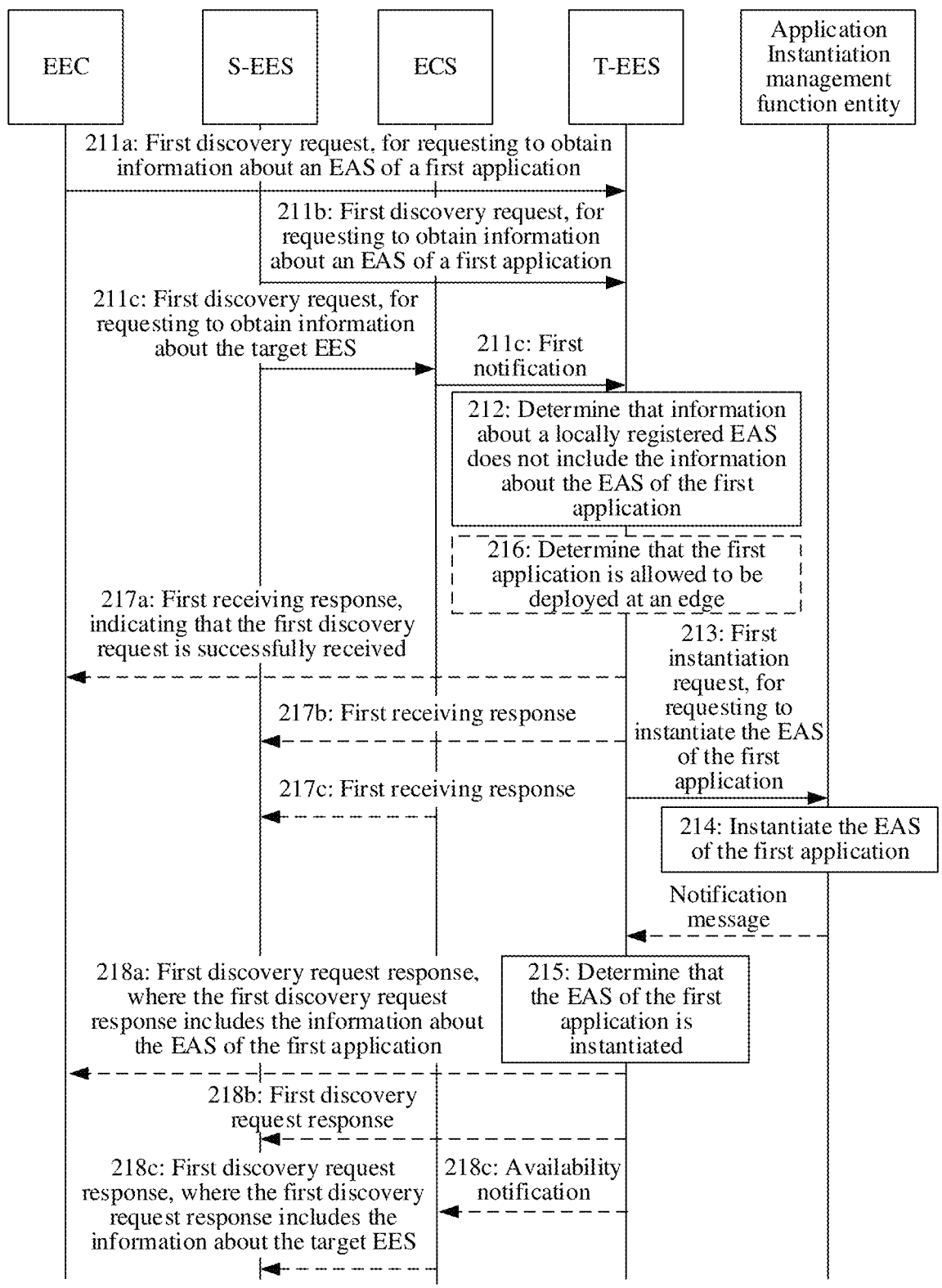
FIG. 2G is a flowchart of a method in which an edge enabler server dynamically triggers instantiation of an edge application server according to an embodiment of this application.

FIG. 2G is a flowchart of a method in which an edge enabler server dynamically triggers instantiation of an edge application server according to an embodiment of this application.

As shown in FIG. 2G, the method includes the following steps.

211a: A terminal sends a first discovery request to an edge enabler server, where the first discovery request is for requesting to obtain information about an edge application server of a first application.

212: The edge enabler server receives the first discovery request, and determines that information about a locally registered edge application server does not include the information about the edge application server of the first application.

213: The edge enabler server sends a first instantiation request to an application instantiation management function entity, where the first instantiation request is for requesting to instantiate the edge application server of the first application.

214: The application instantiation management function entity instantiates the edge application server of the first application based on the first instantiation request.

215: Optionally, the edge enabler server determines that the edge application server of the first application is instantiated.

In this embodiment of this application, for a scenario in which a terminal initially discovers an EAS, the first device is the edge enabler server EES, and the second device is the terminal (which is usually an edge enabler client EEC). The first information sent by the second device to the first device is the first discovery request in this embodiment of this application, and is used by the terminal to request the EES, to obtain the information about the EAS of the first application. The first discovery request may include a terminal identifier for representing an identity of the terminal, or may include an EEC identifier. The first discovery request may further include application information, for example, an application identifier, and may further include location information of the terminal, for example, a geographical location, a longitude and a latitude, an administrative region, a cell identifier, or a tracking area identifier. The EES obtains the information about the EAS of the first application based on the information in the first discovery request, for example, verifies, by using the application identifier, whether the EES includes the information about the EAS corresponding to the first application.

When the EES determines that the EAS that is of the first application and that is indicated by the application identifier does not exist locally, it indicates that there is no available requested information about the EAS in the EES, or it is understood as that information about all registered applications in the EES does not include information about the first application. That there is no available information about the EAS may also be understood as that the EAS of the first application is not instantiated.

After determining that there is locally no information about the EAS of the first application, the EES may dynamically trigger the application instantiation management function entity to instantiate the EAS of the first application. Before the application instantiation management function entity instantiates the EAS of the first application, optionally, the method may further include step 216: The EES determines that the first application is allowed to be deployed at an edge. Specifically, the EES may further determine whether the first application can be deployed at an edge. Alternatively, it may be understood as determining whether the first application can be dynamically instantiated, and may include further checking whether the first application is allowed to be deployed in an edge data network in which the current EES is located. When the first application is allowed to be deployed at an edge (especially the current EES), the EES may request to instantiate the EAS of the first application. An application deployment status at an edge includes an application that can be deployed at an edge (or can be dynamically instantiated) and an edge at which the application is specifically deployed. Authorization information indicating that instantiation can be performed in the EES may be preconfigured in the current EES, may be used as an ECSP policy, or may be obtained by the current EES from an ECSP database through querying.

The first instantiation request sent by the EES is for requesting to instantiate, in the EDN in which the current EES is located, the EAS corresponding to the first application, and further includes requesting to configure the current EES as an EES registered for the EAS. The first instantiation request may carry information about the first application, for example, description information (where a parameter in an EAS configuration (profile) may represent the description information of the application) of the first application, an identifier (EAS ID) of the first application, or a package name (package name). Optionally, the first instantiation request carries at least one of location information or instantiation requirement information. The location information indicates location information of the EDN in which the EAS needs to be instantiated. For example, the location information may be an identifier of the EES, an address of the EES, a DNAI, or other information indicating a location of the EDN. The location can be a physical location or a network topology location. Optionally, the location information may correspond to a plurality of EDNs, including the EDN corresponding to the current EES (the EES that sends the first instantiation request), and another EDN adjacent to the EDN in which the current EES is located (the another EDN may be preconfigured in the current EES). The instantiation requirement information may specifically include an application deployment mode (where one user exclusively uses one edge application server instance, or one edge application server instance is deployed in one EES, or one edge application server instance is deployed in all EESs), a required resource (including a resource required for storage, computing, a network, or the like), a delay, a bandwidth, a dependent service, an MEC feature (for example, supporting application transfer), and the like. In this case, the current EES may assume a role and a function of an OSS, and interact with an application instance management function entity MEO through an Mm 1 interface. Alternatively, the current EES may assume a role and a function of a life cycle management proxy (LCM-proxy), and interact with an application instantiation function entity MEO through an Mm 9 interface. Alternatively, the current EES may interact with an application instantiation function entity MEPM interface through an Mm 4 interface. Alternatively, the current EES may interact with a centralized resource management entity or a distributed resource management entity of a public cloud, where the two entities are responsible for instantiation of an application instance.

If the EES provides only one piece of location information, the application instantiation management function entity instantiates the EAS of the first application in an EDN corresponding to the location. If the EES provides a plurality of pieces of location information, the application instantiation management function entity may select an EDN corresponding to one or more locations from the location information to instantiate the EAS of the first application. If the EES provides the instantiation requirement information, the application instantiation management function entity selects, based on the instantiation requirement information, one or more EDNs to instantiate the EAS of the first application. If the EES provides the location information and the instantiation requirement information, the application instantiation management function entity selects one or more EDNs based on the instantiation requirement information and the location information, and a resource usage status, a communication indicator status, and the like that are of the EDN and that are obtained by the application instantiation management function entity, to instantiate the EAS of the first application. Optionally, when the application instantiation management function entity is a function entity (for example, an MEO) in an MEC management system, the MEC management system configures a registration address EES corresponding to the EAS of the first application, and instantiates, in a specified EDN, the EAS corresponding to the first application. Further, the MEC management system may configure a registration address corresponding to the EAS as the current EES (the EES that sends the first instantiation request).

Optionally, this embodiment of this application may further include step 217a: The EES sends a first response to the terminal, to indicate that the first discovery request is successfully received.

To avoid long waiting duration of a requester (the second device, which is the terminal in this embodiment of this application), before obtaining the information about the EAS of the first application, the EES may first send the first response to the requester. The first response indicates that the first discovery request is successfully accepted, processing is being performed, and a final response is to be returned later.

After the EAS of the first application is instantiated, the EAS is registered with the current EES, and the current EES may determine, based on registration information, that the EAS of the first application is instantiated. Alternatively, the current EES obtains an instantiation completion notification message from the application instantiation management function entity, where the notification message may include an ID of the EAS of the first application, or may further include other information about the EAS, so that the current EES determines that the EAS is instantiated. Further, the current EES may register and update the ID of the EAS based on a first application instance, or update the ID of the EAS based on the notification message.

Optionally, this embodiment of this application may further include step 218a: The EES sends a first discovery request response to the terminal, where the first discovery request response includes the information about the EAS of the first application.

After obtaining the information about the EAS of the first application, the EES may feed back, by using the first discovery request response, the information about the EAS to the terminal that sends the request. Alternatively, the first discovery request response may not include the information about the EAS of the first application, and is only for notifying that the EAS of the first application is instantiated. The terminal needs to initiate a request again, where the request is for requesting to obtain the information about the EAS of the first application.

In this embodiment of this application, after receiving the first discovery request sent by the terminal, the edge enabler server sends the instantiation request to the application instantiation management function entity, to dynamically trigger the application instantiation management function entity to instantiate the edge application server of the first application. In this process, the edge application server is dynamically instantiated based on a user requirement, so that dynamic scheduling and flexible use of a resource are improved. In addition, in this process, the edge enabler server triggers the instantiation of the edge application server, so that real-time performance of the instantiation process is improved.

In an optional case, after the terminal moves, an edge application server that serves a client of the application in the terminal changes. In this case, to maintain continuity of a service of the currently running application, an application context of a user needs to be transferred from the source EAS to a target EAS. In this case, a source EES associated with the source EAS discovers, by using the ECS, a target EES corresponding to a current terminal location, and the source EES needs to request the target EES for information about the target EAS that needs to be accessed by the application in the terminal, to transfer the application context and notify the client of the application in the terminal device of the edge application server to which the service is to be switched.

For this case, this embodiment of this application may include the following steps.

211b: A source edge enabler server sends a first discovery request to a target edge enabler server, where the first discovery request is for requesting to obtain information about an edge application server of a first application.

212: The target edge enabler server receives the first discovery request, and determines that information about a locally registered edge application server does not include the information about the edge application server of the first application.

213: The target edge enabler server sends a first instantiation request to an application instantiation management function entity, where the first instantiation request is for requesting to instantiate the edge application server of the first application.

214: The application instantiation management function entity instantiates the edge application server of the first application based on the first instantiation request.

215: The target edge enabler server determines that the edge application server of the first application is instantiated.

In this embodiment of this application, for a scenario in which the application context is transferred due to a terminal movement, except that the entity that sends the first discovery request changes from the terminal to the S-EES in step 211b, other steps are the same as corresponding descriptions in the embodiments in step 211a to step 215. Details are not described herein again. In addition, the edge enabler server in the embodiments of step 211a to step 215 is referred to as the target edge enabler server (T-EES) in this embodiment of this application.

Optionally, this embodiment of this application may further include step 217b: The T-EES sends a first response to the S-EES, to indicate that the first discovery request is successfully accepted, and processing is being performed. After the T-EES receives the first discovery request and before the T-EES obtains the information about the EAS of the first application, the T-EES may send the first response to the S-EES. The first response indicates that the first discovery request is successfully accepted, processing is being performed, and a final response is to be returned later. This prevents the S-EES from waiting for long duration.

Optionally, this embodiment of this application may further include step 218b: The T-EES sends a first discovery request response to the S-EES, where the first discovery request response includes the information about the EAS of the first application.

After obtaining the information about the EAS of the first application, the T-EES may feed back, by using the first discovery request response, the information about the EAS to the S-EES that sends the request. Alternatively, the first discovery request response may not include the information about the EAS of the first application, and is only for notifying that the EAS of the first application is instantiated. The S-EES needs to initiate a request again, where the request is for requesting to obtain the information about the EAS of the first application.

In an optional case, the EAS of the first application that serves the terminal changes, and the S-EES does not know which target EAS can serve the user. Therefore, the S-EES may initiate request information to the ECS, where the request information is for requesting to obtain the T-EES, and the T-EES is configured to provide the information about the EAS of the first application. The process may specifically include the following steps.

211c: The source edge enabler server sends a first discovery request to the edge configuration server, where the first discovery request is for requesting to obtain information about the target edge enabler server, and the first discovery request includes location information or a DNAI of a terminal device.

212: The edge configuration server receives the first discovery request, determines the target edge enabler server that matches the location information or the DNAI of the terminal device, and sends a first notification to the target edge enabler server, where the first notification is for notifying an edge application server that prepares a first application.

Specifically, the first discovery request optionally carries the location information of the terminal or target DNAI information. The ECS determines that the target EES is an EES that matches a location or the DNAI of the terminal, but the target EES does not include the EAS of the first application. In this case, the request triggers the ECS to send the first notification to the target EES, where the first notification is for notifying the target EES that a user is to request to access information about the EAS of the first application or need the EAS of the first application. Alternatively, the ECS sends a request message to the target EES, where the request message is for requesting the EES to instantiate the EAS of the first application.

213: The target edge enabler server sends a first instantiation request to an application instantiation management function entity, where the first instantiation request is for requesting to instantiate the edge application server of the first application.

214: The application instantiation management function entity instantiates the edge application server of the first application based on the first instantiation request.

215: Optionally, the target edge enabler server determines that the edge application server of the first application is instantiated.

Specifically, in some cases, for example, when the terminal moves, the EAS of the first application that serves the terminal changes. When the S-EES does not know which target EAS can serve the user, the S-EES sends request information to the ECS, and then the ECS sends a notification message to an EES (which is generally an EES that matches a location of the terminal) in a management range, to obtain the information about the EAS of the first application. The ECS may send the notification information to one or more T-EESs. When the T-EES cannot provide the information about the EAS of the first application, the T-EES sends the first instantiation request to the application instantiation management function entity, where the first instantiation request is for requesting to instantiate the edge application server of the first application. To be specific, in this embodiment of this application, the ECS receives the first information, but the T-EES requests the edge application server management function to instantiate the edge application server of the first application. In this case, the first device is a combination of the ECS and the T-EES.

If the ECS sends the notification information to a plurality of T-EESs in the management range, the plurality of T-EESs may send the first instantiation request to the application instantiation management function entity. The application instantiation management function entity may select one or more T-EESs from the plurality of T-EESs and instantiate the EAS of the first application in an EDN in which the one or more T-EESs are located, and configure a registration address corresponding to the EAS as the EES. If the notification information sent by the ECS to the plurality of T-EESs includes instantiation requirement information, the application instantiation management function entity selects one or more T-EESs based on the instantiation requirement information, and instantiates the EAS of the first application in an EDN in which the one or more T-EESs are located This embodiment of this application may further include step 217c: The edge configuration server sends a first receive response to the source edge enabler server, to indicate that the first discovery request is successfully accepted. This prevents the S-EES from waiting for long duration.

This embodiment of this application may further include step 218c: The target edge enabler server sends an instantiation completion notification to the edge configuration server, and the edge configuration server sends the information about the target edge enabler server to the source edge enabler server based on the instantiation completion notification.

After obtaining the information about the EAS of the first application, the T-EES may feed back an availability notification to the ECS, to notify the ECS that the T-EES includes the information about the EAS of the first application, and the information about the EAS may be specifically an identifier corresponding to the EAS of the first application. The ECS may send a first discovery request response to the S-EES based on the availability notification, to notify the S-EES of a T-EES from which the S-EES can request to obtain the information about the EAS of the first application.

Figure 2H:
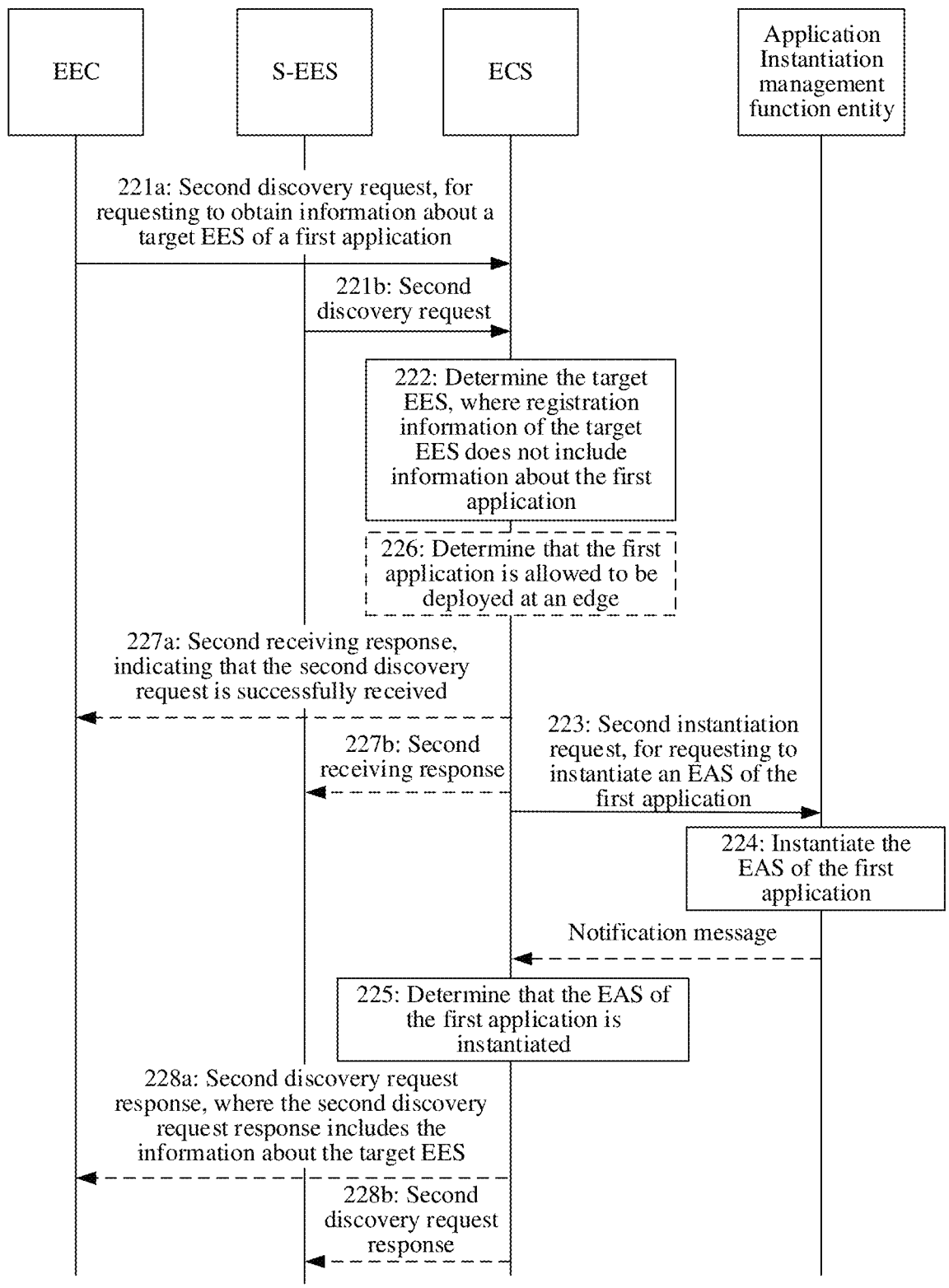
FIG. 2H is a flowchart of a method in which an edge configuration server dynamically triggers instantiation of an edge application server according to an embodiment of this application.

FIG. 2H is a flowchart of a method in which an edge configuration server dynamically triggers instantiation of an edge application server according to an embodiment of this application. As shown in FIG. 2H, the method includes the following steps.

221a: A terminal sends a second discovery request to an edge configuration server, where the second discovery request is for requesting to obtain information about a target edge enabler server that provides information about a first application.

222: The edge configuration server receives the second discovery request, and determines the target edge enabler server that matches a location of the terminal, where registration information of the target edge enabler server does not include the information about the first application.

223: The edge configuration server sends a second instantiation request to an application instantiation management function entity, where the second instantiation request is for requesting to instantiate an edge application server of the first application.

224: The application instantiation management function entity instantiates the edge application server of the first application based on the second instantiation request.

225: The edge configuration server obtains the information about the target edge enabler server.

In this embodiment of this application, the first device is the edge configuration server ECS, and the second device is the terminal. The first information sent by the second device to the first device is the second discovery request in this embodiment of this application, and is used by the terminal to request the ECS, to obtain the information about the target EES. The target EES is an EES that matches the location of the terminal, and the terminal expects the target EES to provide the information about the EAS of the first application. Therefore, the second discovery request includes the information about the first application, for example, an identifier of the first application, so that the information about the first application is used by the ECS to determine whether the EES includes the information about the EAS of the first application. Optionally, the second discovery request further includes an identifier or location information of the terminal, so that the ECS finds the target EES more quickly.

When the ECS determines that an EES matching a requested location does not include the information about the EAS of the first application, it indicates that there is no available information about the EAS of the first application in the EES. This may be understood as that there is no instantiated EAS of the first application. In this case, the ECS may dynamically trigger the application instantiation management function entity to instantiate the EAS of the first application.

Before the ECS dynamically triggers the application instantiation management function entity to instantiate the EAS of the first application, this embodiment of this application may further include step 206: The edge configuration server determines that the first application is allowed to be deployed at an edge. The ECS may further determine whether the first application can be deployed at an edge. Alternatively, it may be understood as determining whether the first application can be dynamically instantiated, and further checking whether the first application is allowed to be deployed in an edge data network in which the current EES is located. After determining that the first application is allowed to be deployed at an edge, the ECS performs the subsequent process of triggering instantiation of the EAS of the first application. An application deployment status at an edge, including related information of an application that can be deployed at an edge (or can be dynamically instantiated) may be preconfigured in the ECS, or may be obtained by the ECS from an ECSP database through querying. The information may also be used as an ECSP policy.

The ECS sends the second instantiation request to the application instantiation management function entity, to trigger the application instantiation management function entity to instantiate the EAS of the first application. The second instantiation request includes the information about the first application, for example, application identifier information, and the information about the first application is for instantiating the EAS of the application. Optionally, the second instantiation request carries at least one of location information or instantiation requirement information. The location information may correspond to one or more candidate locations. In other words, the ECS may request the application instantiation management function entity to instantiate the EAS of the first application in an EDN determined based on the one or more candidate locations. The instantiation requirement information may be for determining a location at which the EAS of the first application is instantiated. For a specific implementation process, refer to related descriptions in step 201a to step 206, and details are not described herein again.

If the ECS provides only one piece of location information, the application instantiation management function entity instantiates the EAS of the first application in an EDN corresponding to the location. If the ECS provides a plurality of locations, the application instantiation management function entity may select one or more locations thereof to instantiate the EAS of the first application. If the ECS provides the instantiation requirement information, the application instantiation management function entity selects, based on the instantiation requirement information, one or more EDNs to instantiate the EAS of the application. Further, an MEC management system may configure a registration address corresponding to the EAS as the target EES, and instantiate, in an EDN of the target EES, the EAS corresponding to the application.

Similarly, to reduce a delay, this embodiment of this application may further include step 227a: The edge configuration server sends a second response to the terminal, to indicate that the second discovery request is successfully accepted.

To avoid long waiting duration of a requester (the second device, which is the terminal in this embodiment of this application), before obtaining the information about the target EES that provides the EAS of the first application, the ECS may first send the second response to the requester. The second response indicates that the second discovery request is successfully accepted, processing is being performed, and a final response is to be returned later.

The application instantiation management function entity instantiates the edge application server of the first application in the EDN corresponding to the target EES. After instantiation, the EAS is registered with the target EES.

Therefore, the target EES may determine, based on registration information of the EAS, that the EAS of the first application is instantiated. In this way, the information in the target EES is updated, and the EES sends updated information about the first application, for example, an identifier of the application, to the ECS. The ECS may further learn that the EAS of the first application may be provided by using the information about the target EES. Alternatively, the application instantiation management function entity may send an instantiation completion notification to the ECS, so that the ECS learns that the EAS of the first application is instantiated, and obtains the information about the target EES.

Optionally, this embodiment of this application further includes step 228a: The edge configuration server sends a response to the second discovery request to the terminal, where the response to the second discovery request includes the information about the target edge enabler server.

After obtaining the information about the target EES, the ECS feeds back the information about the target EES to the terminal by using the response to the second discovery request, so that the terminal obtains the information about the EAS of the first application based on the information about the target EES, to further access the EAS of the first application.

In this embodiment of this application, after receiving the second discovery request sent by the terminal, the edge configuration server sends the instantiation request to the application instantiation management function entity, to dynamically trigger the application instantiation management function entity to instantiate the edge application server of the first application. In this process, the edge application server is dynamically instantiated based on a user requirement, so that dynamic scheduling and flexible use of a resource are improved. In addition, in this process, the edge configuration server triggers instantiation of the edge application server, so that the edge configuration server can manage and schedule an edge enabler server in a range, to improve coordination of the instantiation process.

Optionally, the EES may request the ECS, to obtain the target EES. For example, when the terminal moves, the EAS of the first application that serves the terminal device changes. In this case, when the S-EES does not know which target EAS can serve the user, the S-EES sends request information to the ECS, to request information about a target EES that can provide the target EAS. In this case, the S-EES sends the second discovery request to the ECS, where the second discovery request is for requesting to obtain the T-EES, so as to obtain the information about the EAS of the first application from the T-EES.

For this case, this embodiment of this application includes the following steps.

221b: The source edge enabler server sends a second discovery request to the edge configuration server, where the second discovery request is for requesting to obtain information about a target edge enabler server that provides information about a first application, and the second discovery request may include location information or a target DNAI of a terminal.

222: The edge configuration server receives the second discovery request, and determines the target EES that matches the location information or the DNAI of the terminal device, where the EES does not include information about an EAS of the first application.

223: The edge configuration server sends a second instantiation request to an application instantiation management function entity, where the second instantiation request is for requesting to instantiate the edge application server of the first application.

224: The application instantiation management function entity instantiates the edge application server of the first application based on the second instantiation request.

225: Optionally, the edge configuration server determines that the edge application server of the first application is instantiated.

In this embodiment of this application, except that the entity that sends the second discovery request in 221b changes from the terminal to the S-EES, and that the second discovery request sent by the S-EES to the ECS may include the location information or the target DNAI of the terminal, and the target EES determined by the ECS matches the location or the target DNAI of the terminal, but the target EES does not include the information about the EAS of the first application, other steps are the same as descriptions in the embodiments in step 221a to step 225. Details are not described herein again.

Optionally, this embodiment of this application may further include step 227b: The edge configuration server sends a second response to the source edge enabler server, where the second response indicates that the second discovery request is successfully accepted.

To avoid long waiting duration of a requester (the second device, which is the S-EES in this embodiment of this application), before obtaining the information about the target EES of the first application, the ECS may first send the second response to the requester. The second response indicates that the second discovery request is successfully accepted and a final response is to be returned later.

Optionally, this embodiment of this application may further include step 228b: The edge configuration server sends a response to the second discovery request to the source edge enabler server, where the response to the second discovery request includes the information about the target edge enabler server.

After obtaining the information about the target EES, the ECS feeds back the information about the target EES to the S-EES by using the response to the second discovery request, so that the S-EES requests, based on the information about the target EES, the EAS of the first application that serves the terminal.

Figure 2I:
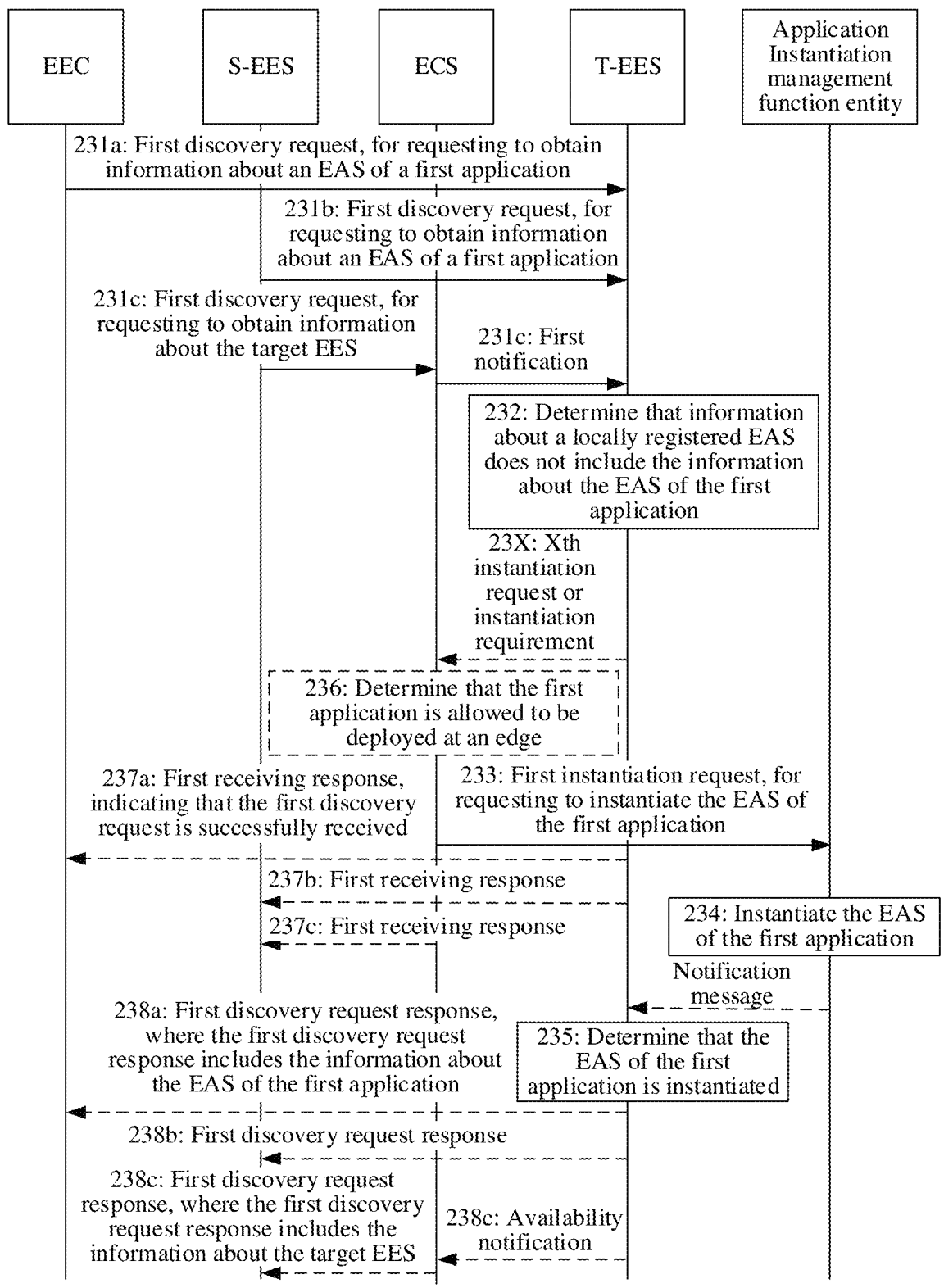
FIG. 2I is a flowchart of a method in which an edge configuration server dynamically triggers instantiation of an edge application server according to an embodiment of this application.

FIG. 2I is a flowchart of a method in which an edge configuration server dynamically triggers instantiation of an edge application server according to an embodiment of this application. As shown in FIG. 2I, the method includes the following steps.

231a: A terminal sends a first discovery request to a target edge enabler server, where the first discovery request is for requesting to obtain information about an edge application server of a first application.

232: The target edge enabler server receives the first discovery request, and determines that information about a locally registered edge application server does not include the information about the edge application server of the first application.

23X: The target edge enabler server sends an instantiation request or an instantiation requirement to an edge configuration server, where the instantiation request or the instantiation requirement is for requesting to instantiate the edge application server of the first application.

233: The edge configuration server sends a first instantiation request to an application instantiation management function entity based on a second instantiation request, where the first instantiation request is for requesting to instantiate the edge application server of the first application;

234: The application instantiation management function entity instantiates the edge application server of the first application based on the first instantiation request.

235: Optionally, a second target edge enabler server determines that the edge application server of the first application is instantiated.

In this embodiment of this application, descriptions are basically the same as those in step 211a to step 215 in the foregoing embodiments. A difference lies in step 23X. After it is determined that the target edge enabler server (an EES requested to obtain the information about the EAS) does not include the information about the EAS of the first application, the application instantiation management function entity is not directly requested to instantiate the EAS of the first application, but the instantiation request or the instantiation requirement is sent to the ECS. In step 233, the ECS determines, based on the received instantiation request or instantiation requirement, whether to request, based on a location of the target EES, the application instantiation management function entity to instantiate the EAS. Alternatively, the ECS may provide more candidate locations for the application instantiation management function entity, so that the ECS selects an EDN of an EES at a proper location in the plurality of candidate locations, to complete instantiation of the EAS of the first application. Alternatively, the instantiation management function entity may select an EDN of one or more EESs from the plurality of candidate locations based on the instantiation requirement, to instantiate the EAS of the first application.

During instantiation, the EAS is registered with an EES corresponding to an EDN in which the EAS is actually instantiated. Therefore, the second target EES (which is an EAS selected to instantiate the first application) may learn, based on registration information, whether the EAS of the first application is instantiated. The second target EES and the target EES may be a same EES, or may be different EESs. Alternatively, the application instantiation management function entity may notify the second target EES that the EAS of the first application is instantiated. Then, the target EES feeds back the information about the EAS of the first application to the terminal.

Optionally, this embodiment of this application may further include step 236a and step 237a that correspond to step 217a and step 218a in the foregoing embodiment. Details are not described herein again.

In an optional case, when the terminal moves, the EAS of the first application that serves the terminal device changes. In this case, to maintain continuity of a service of a currently running application, an application context of a user needs to be transferred from the source EAS to a target EAS. In this case, a source EES managed by the source EAS discovers, by using the ECS, a target EES corresponding to a current terminal location, and the source EES needs to request the target EES for information about the target EAS that needs to be accessed by the application in the terminal, to transfer the application context and notify the client of the application in the terminal device of the edge application server to which the service is to be switched. In this case, the S-EES sends the first discovery request to the T-EES, where the first discovery request is for requesting to obtain the information about the EAS of the first application at the new location.

For this case, this embodiment of this application may include the following steps.

231b: A source edge enabler server sends a first discovery request to a target edge enabler server, where the first discovery request is for requesting to obtain information about an edge application server of a first application.

232: The target edge enabler server receives the first discovery request, and determines that information about a locally registered EAS does not include the information about the edge application server of the first application.

23X: The target edge enabler server sends a second instantiation request or a second instantiation requirement to an edge configuration server, where the second instantiation request or the second instantiation requirement is for requesting to instantiate the edge application server of the first application.

233: The edge configuration server sends a first instantiation request to an application instantiation management function entity, where the first instantiation request is for requesting to instantiate the edge application server of the first application.

234: The application instantiation management function entity instantiates the edge application server of the first application based on the first instantiation request.

235: A second target edge enabler server determines that the edge application server of the first application is instantiated.

In this embodiment of this application, descriptions are basically the same as those in step 211b to step 215 in the foregoing embodiments. A difference lies in step 23X and step 233. This process is the same as the process of step 23X and step 233 in the foregoing embodiments. Details are not described herein again.

Optionally, this embodiment of this application may further include step 236b and step 237b that correspond to step 217b and step 218b in the foregoing embodiment. Details are not described herein again.

Optionally, the EAS of the first application that serves the terminal changes, and the S-EES does not know which target EAS can serve the user. In this case, the S-EES sends the second discovery request to the ECS, where the second discovery request is for requesting to obtain the T-EES, and the T-EES is configured to provide the information about the EAS of the first application.

For this case, this embodiment of this application includes the following steps.

231c: The source edge enabler server sends a first discovery request to the edge configuration server, where the first discovery request is for requesting to obtain information about the target edge enabler server, and the first discovery request may include location information or a target DNAI of a terminal device.

232: The edge configuration server receives the first discovery request, determines the target edge enabler server that matches the location information or the DNAI of the terminal device, and sends a first notification to the target edge enabler server, where the first notification is for notifying information about an edge application server that prepares a first application.

23X: The target edge enabler server sends an instantiation request or an instantiation requirement to an edge configuration server, where the instantiation request or the instantiation requirement is for requesting to instantiate the edge application server of the first application.

Specifically, the first discovery request optionally carries the location information of the terminal or target DNAI information. The ECS determines that the target edge enabler server is an EES that configures a location or the DNAI of the terminal, but the target EES does not include the EAS of the first application. In this case, the request triggers the ECS to send the first notification to the target EES, where the first notification is for notifying the target EES that a user is to request to access information about the EAS of the first application or need the EAS of the first application. After receiving the first notification, the target EES determines that the target EES does not include the EAS of the first application, and sends the instantiation request or the instantiation requirement to the ECS.

233: The edge configuration server sends a first instantiation request to an application instantiation management function entity, where the first instantiation request is for requesting to instantiate the edge application server of the first application.

234: The application instantiation management function entity instantiates the edge application server of the first application based on the first instantiation request.

235: Optionally, the target edge enabler server determines that the edge application server of the first application is instantiated.

In this embodiment of this application, descriptions are basically the same as those in step 211c to step 215 in the foregoing embodiments. A difference lies in step 23X and step 233. This process is the same as the process of step 23X and step 233 in the foregoing embodiments. Details are not described herein again.

Optionally, this embodiment of this application may further include step 236c and step 237c that correspond to step 217c and step 218c in the foregoing embodiment. Details are not described herein again.

It can be learned that, in the embodiment corresponding to FIG. 2I, the edge configuration server and the edge enabler server jointly perform a function of the first device, that is, trigger the application instantiation management function entity to instantiate the edge application server of the first application. In this case, the edge enabler server receives a user requirement, and the edge configuration server triggers the application instantiation management function to instantiate the edge application server, so that real-time performance and coordination of the instantiation process are improved.

Figure 2J:
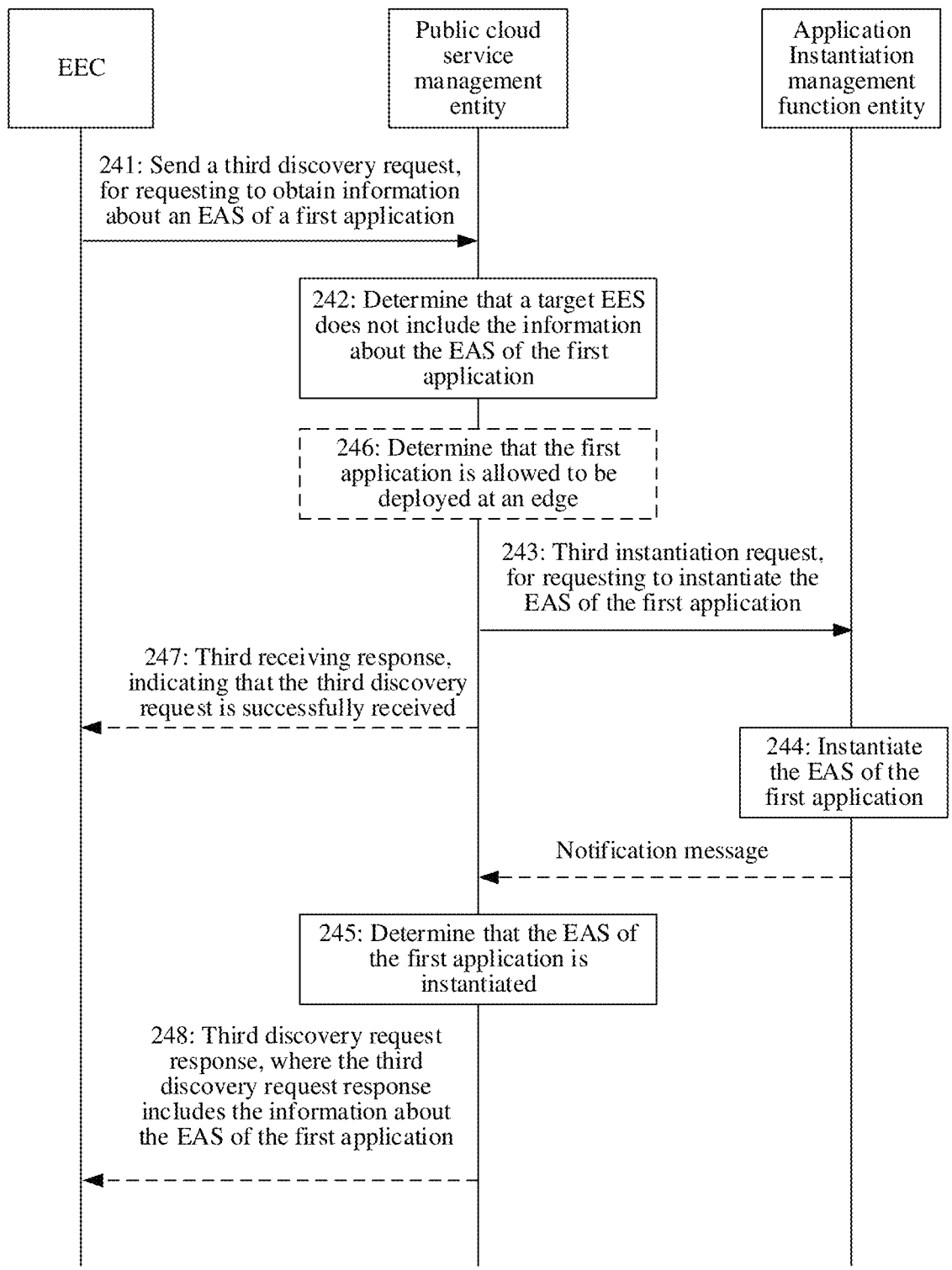
FIG. 2J is a flowchart of a method in which a public cloud service management entity dynamically triggers instantiation of an edge application server according to an embodiment of this application.

FIG. 2J is a flowchart of a method in which a public cloud service management entity dynamically triggers instantiation of an edge application server according to an embodiment of this application. As shown in FIG. 2J, the method includes the following steps.

241: A terminal sends a third discovery request to a public cloud service management entity, where the third discovery request is for requesting to obtain information about an edge application server of a first application.

242: The public cloud service management entity receives the third discovery request, and determines that a target EES does not include the information about the edge application server of the first application.

243: The public cloud service management entity sends a third instantiation request to an application instantiation management function entity, where the third instantiation request is for requesting to instantiate the edge application server of the first application.

244: The application instantiation management function entity instantiates the edge application server of the first application based on the third instantiation request.

245: The public cloud service management entity determines that the edge application server of the first application is instantiated.

In this embodiment of this application, the first device is the public cloud service management entity, the second device is the terminal, and the first information sent by the second device to the first device is the third discovery request in this embodiment of this application, where the third discovery request is used by the terminal to request the public cloud service management entity, to obtain the information about the EAS of the first application. The public cloud service management entity may be a public cloud centralized control management node in the scenario 5, or may be a public cloud/edge cloud resource management function entity. The third discovery request includes information about the first application, for example, an identifier of the first application, and is used by the public cloud service management entity to determine whether the information about the first application is included. Optionally, the third discovery request further includes an identifier or location information of the terminal, so that the public cloud service management entity more quickly finds a possible location of the information about the EAS of the first application.

That the public cloud service management entity determines that an EES at a request-matching location does not include the information about the first application may be understood as that a corresponding EDN does not include an EAS for instantiating the first application, or may be understood as that there is no EAS for instantiating the first application. In this case, the public cloud service management entity may dynamically trigger the application instantiation management function entity to instantiate the EAS of the first application.

Before the public cloud service management entity dynamically triggers the application instantiation management function entity to instantiate the EAS of the first application, this embodiment of this application may further include step 246: The public cloud service management entity determines that the first application may be deployed at an edge. The public cloud service management entity may further determine whether the first application can be deployed at an edge. Alternatively, it may be understood as determining whether the first application can be dynamically instantiated, and further checking whether the first application is allowed to be deployed in a matching EDN. After determining that the first application is allowed to be deployed at an edge, the public cloud service management entity performs a subsequent operation of triggering instantiation. An application deployment status at an edge, including related information of an application that can be deployed at an edge (or can be dynamically instantiated) may be preconfigured in the public cloud service management entity.

The public cloud service management entity sends the third instantiation request to the application instantiation management function entity, to trigger the application instantiation management function entity to instantiate the EAS of the first application. The third instantiation request includes the information about the first application, for example, application identifier information, and the information about the first application is for instantiating the EAS of the application. Optionally, the third instantiation request carries at least one of location information or instantiation requirement information. The location information may correspond to one or more candidate locations. In other words, the public cloud service management entity may request the application instantiation management function entity to instantiate the EAS of the first application in an EDN determined based on the one or more candidate locations. It is assumed that the third instantiation request carries the instantiation requirement information, where the instantiation requirement information may be for determining a location at which the EAS is instantiated. For a specific implementation process, refer to related descriptions in step 201*a* to step 206, and details are not described herein again.

After determining an EES at a specific location, the application instantiation management function entity instantiates the edge application server of the first application in an EDN corresponding to the EES. After the EAS is instantiated, the EAS is registered with the EES. Therefore, the EES may determine, based on registration information of the EAS, that the EAS of the first application is instantiated. In this way, the public cloud service management entity may learn that the EAS of the first application is instantiated. Alternatively, the application instantiation management function entity may send an instantiation completion notification to the public cloud service management entity, so that the public cloud service management entity learns that the EAS of the first application is instantiated.

Similarly, to reduce a delay, this embodiment of this application may further include step 247: The public cloud service management entity sends a third receiving response to the terminal, where the third receiving response indicates that the third discovery request is successfully received.

Optionally, this embodiment of this application further includes step 248: The public cloud service management entity sends a third discovery request response to the terminal, where the third discovery request response includes the information about the edge application server of the first application.

Figure 3A:
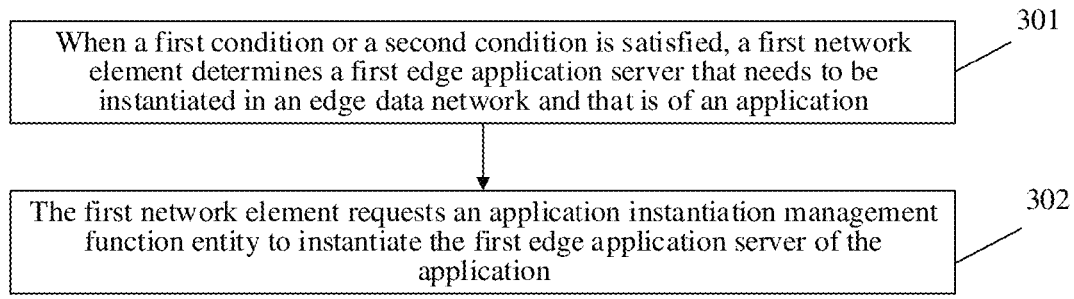
FIG. 3A is a flowchart of another method for dynamically triggering instantiation of an edge application server according to an embodiment of this application.

FIG. 3A is a flowchart of another method for dynamically triggering instantiation of an edge application server according to an embodiment of this application. As shown in FIG. 3A, the method includes the following steps.

301: When a first condition or a second condition is satisfied, a first device determines a first edge application server that needs to be instantiated in an edge data network and that is of an application.

302: The first device requests an application instantiation management function entity to instantiate the first edge application server of the application.

As described in the foregoing embodiment corresponding to FIG. 2A, applications deployed in an edge data network may be classified into an application based on single-user deployment, or an application based on multi-user deployment. In this embodiment of this application, the application based on multi-user deployment is described. Similarly, this embodiment of this application may correspond to the application scenarios of the foregoing scenario 1 to scenario 5.

In some cases, for example, when the first condition or the second condition is satisfied, it may be determined that an edge application server needs to be instantiated in the edge data network, namely, the first edge application server of the application. The first condition or the second condition may be a condition based on user traffic. In addition, when there is no edge application server of the application, the first edge application server of the application may be instantiated. Alternatively, when there is an edge application server of the application, the first edge application server of the application may be newly added.

After determining that the first edge application server of the application needs to be instantiated, the first device requests the edge application server management function entity to instantiate the first edge application server of the application. The first device may be an edge configuration server ECS, an edge enabler server EES, or a public cloud service management entity.

It can be learned that, in this embodiment of this application, the first device determines, based on whether the first condition or the second condition is satisfied, whether to request the edge application server management function entity to instantiate the first edge application server of the application. The first condition and the second condition are both conditions related to user traffic. In other words, the first device triggers instantiation of the edge application server based on a user requirement, so that dynamic scheduling and flexible use of a resource are improved.

The following describes a specific implementation process of this method for different first devices and different application scenarios.

Figure 3B:
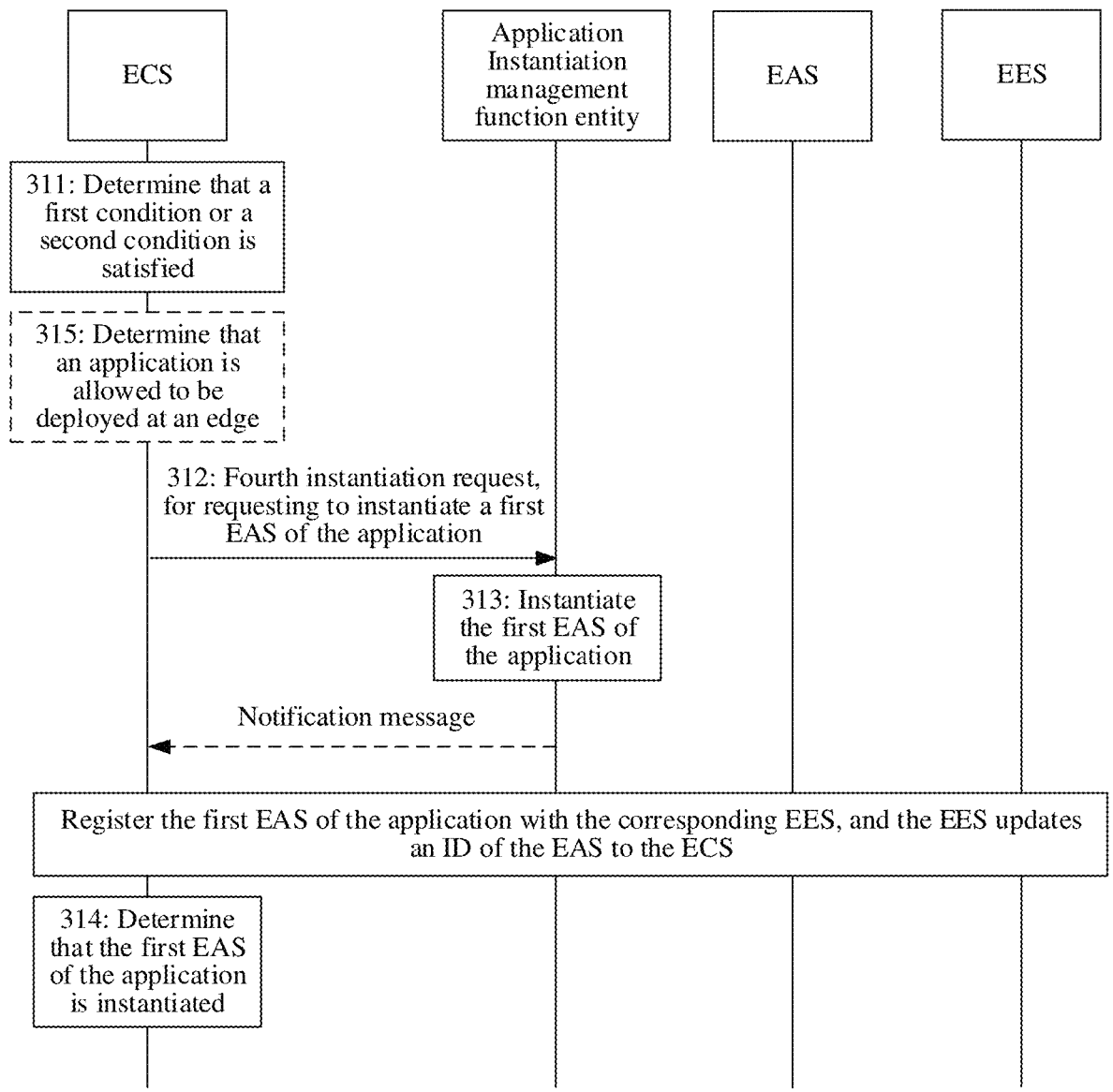
FIG. 3B is a flowchart of a method in which an edge configuration server dynamically triggers instantiation of an edge application server according to an embodiment of this application.

FIG. 3B is a flowchart of a method in which an edge configuration server dynamically triggers instantiation of an edge application server according to an embodiment of this application. As shown in FIG. 3B, the method includes the following steps.

311: An edge configuration server determines that a first condition or a second condition is satisfied.

312: The edge configuration server sends a fourth instantiation request to an application instantiation management function entity, where the fourth instantiation request is for requesting to instantiate a first edge application server of an application in an edge data network.

313: The application instantiation management function entity instantiates the first edge application server of the application in the edge data network based on the fourth instantiation request.

314: The edge configuration server determines that the first edge application server of the application is instantiated.

In this embodiment of this application, the first device is the edge configuration server ECS.

In this embodiment of this application, the first condition is at least one of the following:

(1) When there is no edge application server of the application in the edge data network, a quantity of times for which the first device receives request information is greater than or equal to a first threshold, where the request information is for requesting information about the edge application server of the application in the edge data network, or is for requesting information about a target edge enabler server, where the target edge enabler server is configured to provide information about the edge application server of the application in the edge data network.

(2) When there is no edge application server of the application in the edge data network, recommendation information of the application is obtained from a network data analytics function NWDAF.

(3) When there is no edge application server of the application in the edge data network, it is determined that a quantity of times for which an edge application server of a second application requests a service is greater than or equal to a second threshold, where the service needs to be provided by the edge application server of the application.

(4) When there is no edge application server of the application in the edge data network, it is determined that a third application needs to depend on a service provided by the edge application server of the application.

(5) When there is no edge application server of the application in the edge data network, it is determined that at least one user of the application is about to reach the edge data network.

(6) When there is no edge application server of the application in the edge data network, registration information of an edge enabler server is received, where there is no identifier of the application in the registration information.

For ease of description, in this embodiment of this application, the application that needs to obtain the first edge application server of the application is referred to as a target application, and the edge data network in which the first edge application server of the application is instantiated is referred to as a target EDN.

First, for the first condition, the ECS first needs to determine that the target EDN does not include the EAS of the target application, and a user cannot obtain a service of the target application. A method in which the ECS determines that the target EDN does not include the EAS of the target application includes: First determine that the target EDN is an EDN in which an EES in a range of the ECS is located. Then, there is no target application in the EES corresponding to the target EDN, that is, information about EASs of all registered applications in the EES does not include information about the target application; or there is no available information about the requested EAS in the EES, which may be understood as that the EAS of the target application is not instantiated.

For the condition (1), the quantity of times for which the first device receives the request information is greater than or equal to the first threshold. The first device is the ECS, the received request information is for requesting the target EES, and the target EES is configured to provide information about the EAS of the target application in the target EDN. To be specific, at least one user sends the request information for one or more times, to request to obtain, at a same location (the target EDN corresponding to the target EES), an EES that can provide an EAS of a same application (the target application). The total quantity T1 of requesting times is greater than or equal to the first threshold X1. The first threshold may be a preset value, for example, a value set based on an application type, or a value set based on a bearer capability of the edge data network. In this case, it indicates that a quantity of times for which the target application is accessed at the target location is large, and the ECS may trigger the application instantiation management function entity to instantiate the EAS of the target application in the target EDN, to satisfy a user requirement.

For the condition (2), the ECS obtains the recommendation information of the application from the network data analytics function (network data analytics function, NWDAF) entity. The NWDAF analyzes information such as a communication connection and data access in a network. The ECS may subscribe to a recommendation function of the NWDAF, and the NWDAF pushes an application status to the ECS. In some cases, the NWDAF may recommend the target application to the ECS, indicating that the target application may need to provide a service in some future cases. In this case, the ECS may trigger the application instantiation management function entity to instantiate the EAS of the target application in the target EDN, so as to prepare for providing a service in advance.

For the condition (3), it is determined that the quantity of times for which the edge application server of the second application requests a service is greater than or equal to the second threshold, where the service needs to be provided by the edge application server of the application. The second application is another application other than the target application. When the another application needs the edge application server of the target application to provide a service, and the quantity T2 of times of requesting a service is greater than or equal to the second threshold X2, it indicates that function implementation of the second application needs to be supported by the target application, and a quantity of times for which the second application is accessed is large. In this case, the ECS may trigger the application instantiation management function entity to instantiate the EAS of the target application in the target EDN, to support the second application.

For the condition (4), it is determined that the third application needs to depend on a service provided by the edge application server of the application. The third application is another application other than the target application, and the another application needs to depend on a service provided by the edge application server of the target application. When the edge application server of the target application is not instantiated, the third application cannot be enabled either. In this case, the ECS may trigger the application instantiation management function entity to instantiate the EAS of the target application in the target EDN, so as to support the third application.

For the condition (5), it is determined that the at least one user of the application is about to reach the edge data network. If the at least one user is about to reach the target EDN, it indicates that the at least one user is about to request to obtain a service of the target application. In this case, the ECS may trigger the application instantiation management function entity to instantiate the EAS of the target application in the target EDN, so as to prepare for a user requirement in advance.

For the condition (6), the registration information of the edge enabler server is received, where there is no identifier of the application in the registration information. The ECS has determined that the target EDN does not include the EAS of the target application. Then, the EES in the ECS receives the registration information, and the registration information does not include the identifier of the target application either. It indicates that a latest instantiated application in the EDN does no include the target application. In this case, the ECS may trigger the application instantiation management function entity to instantiate the EAS of the target application in the target EDN, so as to prepare for providing a service for the target application in advance.

The foregoing conditions may be used independently or in combination. For example, after determining that there is no EAS of the target application in the EDN, the ECS further receives the request information that is for requesting the target EES, where the quantity of times for which the request information is received is greater than the first threshold; and the ECS further receives the recommendation information from the NEDAF, where the recommendation information is for recommending the target application to the ECS. When both the two conditions are satisfied, the ECS triggers the application instantiation management function entity to instantiate the EAS of the target application in the target EDN.

Optionally, that the first EAS of the application needs to be instantiated in the EDN may alternatively be determined based on the second condition. The second condition includes: When there is a second edge application server of the application in the edge data network, and the second edge application server exceeds a service bearing capability, the second edge application server of the application provides a current edge network service for the application.

For the second condition, the ECS first determines, in a platform EES in a management range, that there is the second EAS of the target application in the EDN. In other words, the EAS of the target application already exists in the EDN, and the EAS can also serve a user. However, the second EAS already exceeds the service bearing capability, and an additional EAS is required to provide more bearer support.

Optionally, that the second edge application server exceeds a service bearing capability includes at least one of the following: a quantity of users served by the second edge application server reaches a third threshold; traffic of users served by the second edge application server reaches a fourth threshold; or a resource consumed by the second edge application server reaches a fifth threshold.

That the second EAS of the application already exceeds the service bearing capability may be determined based on the quantity of users of the second EAS, the traffic of users, or the resource consumed by the second EAS. When the quantity of users is greater than or equal to the third threshold, the traffic of users is greater than or equal to the fourth threshold, or the consumed resource reaches the fifth threshold, it may be determined, based on that any condition is satisfied, that the second EAS already exceeds the service bearing capability, or it may be determined, based on that a plurality of conditions are satisfied, that the second EAS already exceeds the service bearing capability. The quantity of users, the traffic of users, and the resource consumed by the second EAS may be determined by the ECS based on information reported by the EAS, may be determined based on information reported by an EES, or may be determined based on information of a resource management system. The resource consumed by the second EAS includes a storage resource, a computing resource, or the like consumed by the second EAS.

Optionally, because the first EAS of the application is a supplement to the second EAS, the first EAS may be dynamically enabled or disabled. For example, when the second EAS exceeds the service bearing capability, the second EAS may be instantiated in the EDN, and after the second EAS is restored to the service bearing capability, the first EAS of the application may be disabled.

After determining that the first condition or the second condition is satisfied, the ECS may trigger to instantiate the first EAS of the application. Alternatively, step 315 may be performed: The edge configuration server determines that the application is allowed to be deployed at an edge. In other words, an EAS corresponding to only an application that is allowed to be deployed at an edge is triggered to be instantiated.

After the ECS triggers the application instantiation management function entity to instantiate the first EAS of the application, because an instantiation process of the first EAS needs to be registered in the EES, the ECS may determine, based on information reported by the EES, that the first EAS of the application is registered. Alternatively, the ECS may receive a notification message from the application instantiation management function entity, and determine, based on the notification message, that the first EAS of the application is instantiated.

It can be learned that, in this embodiment of this application, when there is no first edge application server of the application in the EDN, the edge configuration server may trigger, based on the first condition, the application instantiation management function entity to instantiate the first edge application server of the application. Alternatively, when there is no second edge application server of the application in the EDN, the edge configuration server may trigger, based on whether the second EAS exceeds the service bearing capability, the application instantiation management function entity to instantiate the first edge application server of the application, so that dynamic scheduling and flexible use of a resource are improved.

Figure 3C:
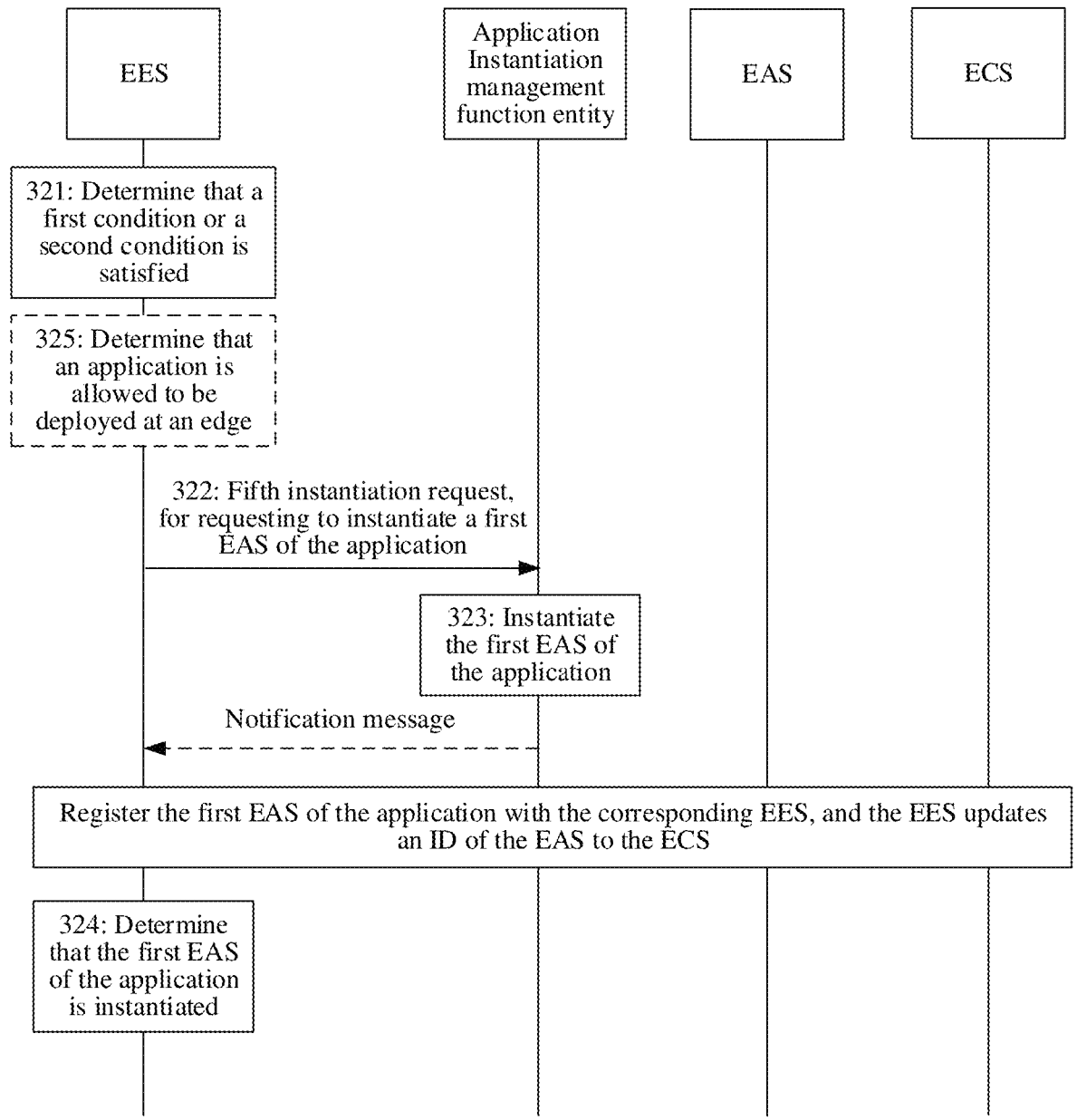
FIG. 3C is a flowchart of a method in which an edge enabler server dynamically triggers instantiation of an edge application server according to an embodiment of this application.

FIG. 3C is a flowchart of a method in which an edge enabler server dynamically triggers instantiation of an edge application server according to an embodiment of this application. As shown in FIG. 3C, the method includes the following steps.

321: An edge enabler server determines whether a first condition or a second condition is satisfied.

322: When determining that the first condition or the second condition is satisfied, the edge enabler server sends a fifth instantiation request to an application instantiation management function entity, where the fifth instantiation request is for requesting to instantiate a first edge application server of an application in an edge data network.

323: The application instantiation management function entity instantiates the first edge application server of the application in the edge data network based on the fifth instantiation request.

324: The edge enabler server determines that the first edge application server of the application is instantiated.

In this embodiment of this application, the first device is the edge enabler server EES.

The first condition specifically includes at least one of the following:

(1) When there is no edge application server of the application in the edge data network, a quantity of times for which the first device receives request information is greater than or equal to a first threshold, where the request information is for requesting information about the edge application server of the application in the edge data network, or is for requesting information about a target edge enabler server, where the target edge enabler server is configured to provide information about the edge application server of the application in the edge data network.

(2) When there is no edge application server of the application in the edge data network, recommendation information of the application is obtained from a network data analytics function NWDAF.

(3) When there is no edge application server of the application in the edge data network, it is determined that a quantity of times for which an edge application server of a second application requests a service is greater than or equal to a second threshold, where the service needs to be provided by the edge application server of the application.

(4) When there is no edge application server of the application in the edge data network, it is determined that a third application needs to depend on a service provided by the edge application server of the application.

(5) When there is no edge application server of the application in the edge data network, it is determined that at least one user of the application is about to reach the edge data network.

For ease of description, in this embodiment of this application, the application that needs to obtain the first edge application server of the application is referred to as a target application, and the edge data network in which the first edge application server of the application is instantiated is referred to as a target EDN.

When the first device is the EES, the EES may manage an EAS of an application that is registered with the EES, and can also determine whether information about the application exists locally. If whether there is the edge application server of the application in the target EDN can be determined, it indicates that the target EDN is an EDN corresponding to the current EES (the first device).

For the first condition, the EES first needs to determine that the target EDN does not include the EAS of the target application, and a user cannot obtain a service of the target application. A method in which the EES determines that there is no EAS of the target application in the target EDN includes: Determine that there is no target application in the EES, that is, information about all registered applications in the EES does not include information about the target application; or there is no available information about the requested EAS in the EES, which may be understood as that the EAS of the target application is not instantiated.

For the condition (1), the quantity of times for which the first device receives the request information is greater than or equal to the first threshold. The first device is the EES, and the received request information is for requesting the information about the EAS of the target application. To be specific, at least one user sends the request information for one or more times, to request to access a same application (the target application) at a same location (the EDN corresponding to the EES). The total quantity T1 of requesting times is greater than or equal to the first threshold X1. The first threshold may be a preset value, for example, a value set based on an application type, or a value set based on a bearer capability of the edge data network. In this case, it indicates that a quantity of times for which the target application is accessed at the target location is large, and the EES may trigger the application instantiation management function entity to instantiate the EAS of the target application in the target EDN, to satisfy a user requirement.

Specific descriptions of the condition (2) to the condition (5) are generally the same as those of the condition (2) to the condition (5) in the embodiment corresponding to FIG. 3B. A difference lies in that, in the condition (3), when the edge application server of the second application requests a service by directly initiating a request to the EES in which the target EDN is located, the EES determines the quantity of times for which the second application requests a service. In this embodiment of this application, the EES may trigger the application instantiation management function entity to instantiate the first EAS of the application. In the embodiment corresponding to FIG. 3B, the EES may report the quantity of times for which the second application requests a service to the ECS, and the ECS triggers the application instantiation management function entity to instantiate the first EAS of the application.

Similarly, for the condition (4), a dependency relationship between the third application and the edge application server of the application may be determined by the EES. In this embodiment of this application, the EES triggers subsequent instantiation. In the embodiment corresponding to FIG. 3B, the EES reports the dependency relationship to the ECS, and the EES triggers subsequent instantiation.

Similarly, the foregoing conditions may be used independently or in combination.

Optionally, that the first EAS of the application needs to be instantiated in the EDN may alternatively be determined based on the second condition. The second condition includes: When there is a second edge application server of the application in the edge data network, and the second edge application server exceeds a service bearing capability, the second edge application server of the application provides a current edge network service for the application.

The target EDN is an EDN corresponding to the current EES (the first device), and the second EAS of the application may be in the target EDN or may be in another EDN. Assuming that the second EAS of the application is in the target EDN, the EES may directly determine whether the second EAS exceeds the service bearing capability. Assuming that the second EAS of the application is in another EDN, and the another EES may determine whether the second EAS exceeds the service bearing capability, and notify the current EES when the second EAS exceeds the service bearing capability. After determining that the second EAS exceeds the service bearing capability, the current EES triggers the application instantiation management function entity to instantiate the first EAS of the application in the target EDN.

A method for determining whether the second EAS exceeds the service bearing capability Is the same as that in the embodiment corresponding to FIG. 3B, and details are not described herein again.

It can be learned that, in this embodiment of this application, when there is no first edge application server of the application in the EDN, the edge enabler server may trigger, based on the first condition, the application instantiation management function entity to instantiate the first edge application server of the application. Alternatively, when there is the second edge application server of the application in the EDN, the edge enabler server may trigger, based on whether the second EAS exceeds the service bearer capability, the application instantiation management function entity to instantiate the first edge application server of the application, so that dynamic scheduling and flexible use of a resource are improved.

Figure 3D:
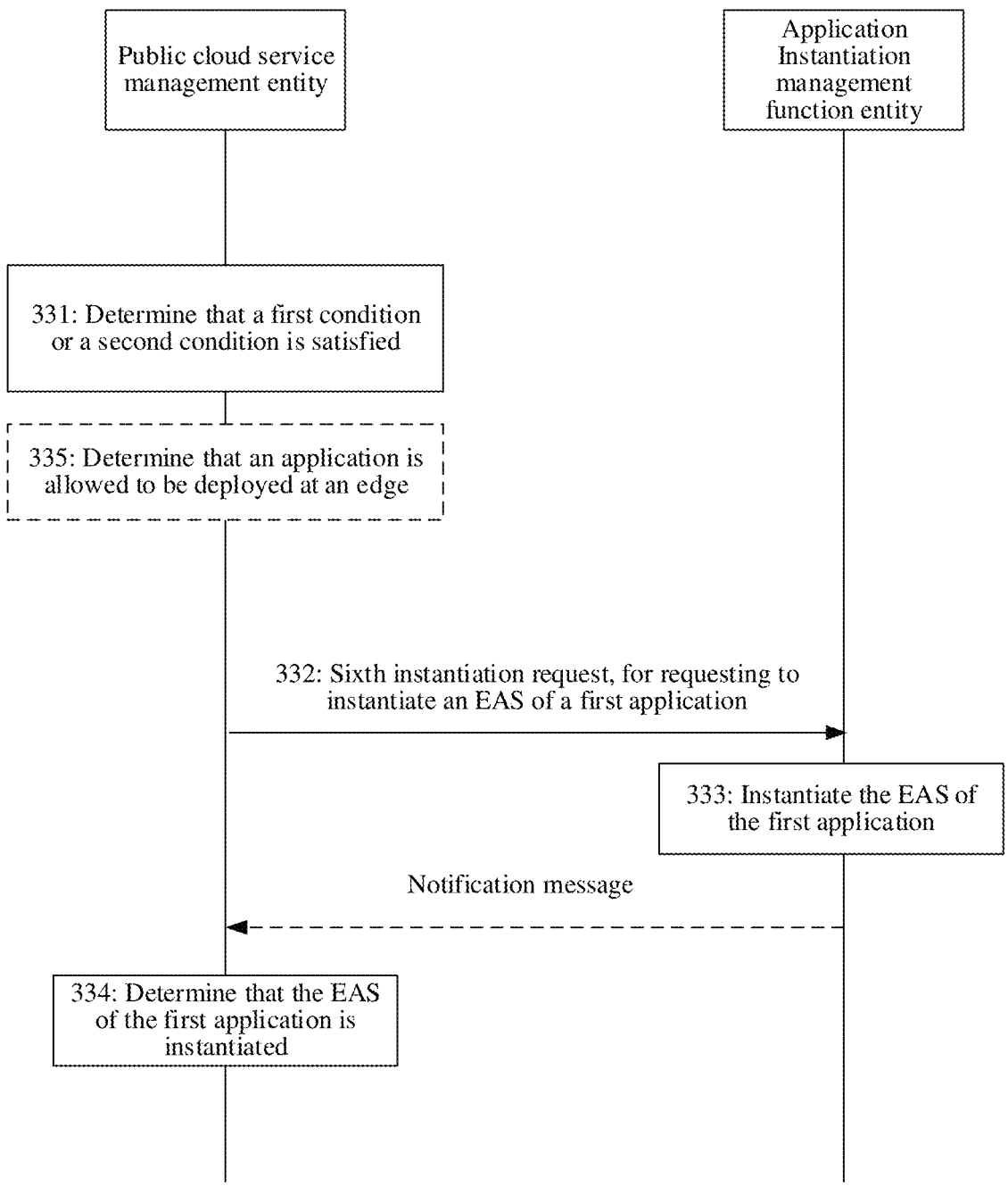
FIG. 3D is a flowchart of a method in which a public cloud service management entity dynamically triggers instantiation of an edge application server according to an embodiment of this application.

FIG. 3D is a flowchart of a method in which a public cloud service management entity dynamically triggers instantiation of an edge application server according to an embodiment of this application. As shown in FIG. 3D, the method includes the following steps.

331: A public cloud service management entity determines whether a first condition or a second condition is satisfied.

332: When determining that the first condition or the second condition is satisfied, the public cloud service management entity sends a sixth instantiation request to an application instantiation management function entity, where the sixth instantiation request is for requesting to instantiate a first edge application server of an application in an edge data network.

333: The application instantiation management function entity instantiates the first edge application server of the application in the edge data network based on the sixth instantiation request.

334: The public cloud service management entity determines that the first edge application server of the application is instantiated.

In this embodiment of this application, the first device is the public cloud service management entity.

In addition, the first condition and the second condition in this embodiment of this application are the same as the first condition and the second condition in the foregoing two embodiments, and the public cloud management entity can manage both the EES and the ECS. Therefore, the public cloud management may receive a terminal request. The request may be information about an EAS for a specific EDN application, or may be information for a platform EES. The platform EES may provide information about an EAS of a specific EDN application.

For other descriptions of the first condition and the second condition, refer to the foregoing two embodiments. Details are not described again in this embodiment of this application again.

It can be learned that, in this embodiment of this application, when there is no first edge application server of the application in the EDN, the public cloud service management entity may trigger, based on the first condition, the application instantiation management function entity to instantiate the first edge application server of the application. Alternatively, when there is the second edge application server of the application in the EDN, the public cloud service management entity may trigger, based on whether the second EAS exceeds the service bearer capability, the application instantiation management function entity to instantiate the first edge application server of the application, so that dynamic scheduling and flexible use of a resource are improved.

The foregoing mainly describes the solutions provided in this application from the perspective of interaction between devices. It may be understood that, to implement the foregoing functions, each device includes a corresponding hardware structure and/or software module for executing each function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the terminal, the control plane device, the service function device, the management function device, or the another network device may be divided into functional modules based on the foregoing method examples. For example, the functional modules may be divided based on functions, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 4:
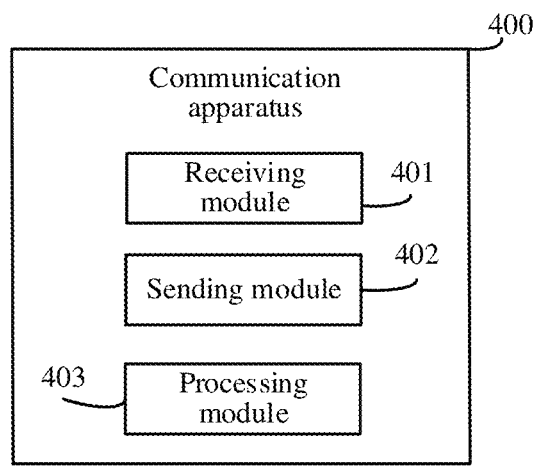
FIG. 4 is a block diagram of a structure of a control plane device according to an embodiment of this application.

FIG. 4 shows a control plane device 400 according to an embodiment of this application. The control plane device 400 may be configured to perform the foregoing method that is for dynamically triggering instantiation of an edge application server and that is applied to the first device in FIG. 2A to FIG. 2I, and perform specific embodiments. In a possible implementation, as shown in FIG. 4, the device 400 includes a receiving module 401, a sending module 402, and a processing module 403.

The receiving module 401 is configured to receive first information, where the first information is for requesting information about an edge application server of a first application, or is for requesting information about a first edge enabler server, where the first edge enabler server is configured to provide information about an edge application server of a first application.

The processing module 403 is configured to request, with reference to the sending module 402 and based on the first information, an application instantiation management function entity to instantiate the edge application server of the first application.

Optionally, the processing module 403 is further configured to determine that the edge application server of the first application is not instantiated.

Optionally, the processing module 403 is further configured to request, with reference to the sending module, the application instantiation management function entity to instantiate the edge application server of the first application in an edge data network corresponding to the first device.

Optionally, the processing module 403 is further configured to request, with reference to the sending module, the application instantiation management function entity to instantiate the edge application server of the first application in an edge data network corresponding to the first edge enabler server.

Optionally, the sending module 402 is configured to send requirement information to the application instantiation management function entity, where the requirement information includes at least one of the following:

at least one piece of candidate location information, where the candidate location information indicates an edge data network for instantiating the edge application server of the application; and at least one requirement description of the edge application server of the application, where the requirement description includes at least one of the following: deployment mode information, information about a required resource, information about a required key communication indicator, a dependent service or application, or whether context transfer is supported.

Optionally, the receiving module 401 is further configured to receive a notification message from the application instantiation management function entity, where the notification message indicates that the edge application server of the application is instantiated.

Optionally, the receiving module 401 is further configured to receive identifier information of the instantiated edge application server of the application.

Optionally, the sending module 402 is further configured to send information about the instantiated edge application server of the application to a second device, where the second device is a device that sends the first information.

Optionally, the processing module 403 may be a chip, an encoder, an encoding circuit, or another integrated circuit that can implement the method in this application.

Optionally, the receiving module 401 and the sending module 402 may be an interface circuit or a transceiver.

A specific method and embodiment have been described above, and the device 400 is configured to perform the method that is for dynamically triggering instantiation of an edge application server and that corresponds to the first device. Therefore, for specific descriptions of the method, refer to a related part in the corresponding embodiment. Details are not described herein again.

Optionally, the device 400 may further include a storage module (which is not shown in the figure). The storage module may be configured to store data and/or signaling. The storage module may be coupled to the processing module 403, or may be coupled to the receiving module 401 or the sending module 402. For example, the processing module 403 may be configured to read the data and/or the signaling in the storage module, to perform the key obtaining method in the foregoing method embodiments.

Figure 5:
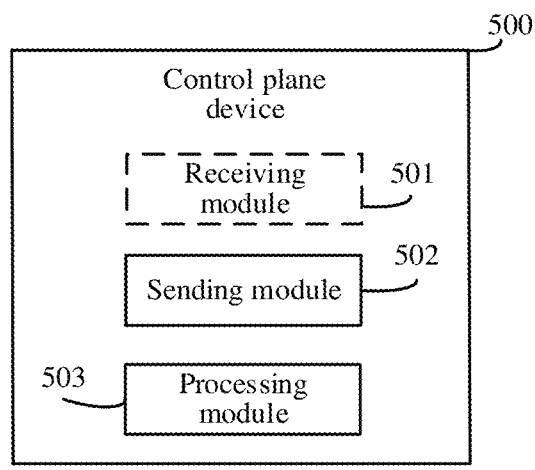
FIG. 5 is a block diagram of a structure of another control plane device according to an embodiment of this application.

FIG. 5 shows another control plane device 500 according to an embodiment of this application. The control plane device 500 may be configured to perform the foregoing method that is for dynamically triggering instantiation of an edge application server and that is applied to the first device in FIG. 3A to FIG. 3D, and perform specific embodiments. In a possible implementation, as shown in FIG. 5, the device 500 includes a processing module 503 and a sending module 502.

The processing module 503 is configured to: when a first condition or a second condition is satisfied, determine a first edge application server that needs to be instantiated in an edge data network and that is of an application.

The processing module 503 is further configured to request, with reference to the sending module 502, an application instantiation management function entity to instantiate the first edge application server of the application.

Optionally, the first condition is at least one of the following:

when there is no edge application server of the application in the edge data network, a quantity of times for which the first device receives request information is greater than or equal to a first threshold, where the request information is for requesting information about the edge application server of the application in the edge data network, or is for requesting information about a target edge enabler server, where the target edge enabler server is configured to provide information about the edge application server of the application in the edge data network;

when there is no edge application server of the application in the edge data network, recommendation information of the application is obtained from a network data analytics function NWDAF;

when there is no edge application server of the application in the edge data network, it is determined that a quantity of times for which an edge application server of a second application requests a service is greater than or equal to a second threshold, where the service needs to be provided by the edge application server of the application;

when there is no edge application server of the application in the edge data network, it is determined that a third application needs to depend on a service provided by the edge application server of the application;

when there is no edge application server of the application in the edge data network, it is determined that at least one user of the application is about to reach the edge data network; or when there is no edge application server of the application in the edge data network, registration information of an edge enabler server is received, where there is no identifier of the application in the registration information.

Optionally, the second condition is: when there is a second edge application server of the application in the edge data network, and the second edge application server exceeds a service bearing capability, the second edge application server of the application provides a current edge network service for the application.

Optionally, that the second edge application server exceeds a service bearing capability includes at least one of the following:

a quantity of users served by the second edge application server reaches a third threshold;

traffic of users served by the second edge application server reaches a fourth threshold; or a resource consumed by the second edge application server reaches a fifth threshold.

Optionally, the processing module 503 may be a chip, an encoder, an encoding circuit, or another integrated circuit that can implement the method in this application.

Optionally, the control plane device 500 may further include a receiving module 501, and the receiving module 501 and the sending module 502 may be an interface circuit or a transceiver.

A specific method and embodiment have been described above, and the control plane device 500 is configured to perform the method that is for dynamically triggering instantiation of an edge application server and that corresponds to the first device. Therefore, for specific descriptions of the method, refer to a related part in the corresponding embodiment. Details are not described herein again.

Optionally, the device 500 may further include a storage module (which is not shown in the figure). The storage module may be configured to store data and/or signaling. The storage module may be coupled to the processing module 503, or may be coupled to the receiving module 501 or the sending module 502. For example, the processing module 503 may be configured to read the data and/or the signaling in the storage module, to perform the key obtaining method in the foregoing method embodiments.

Figure 6:
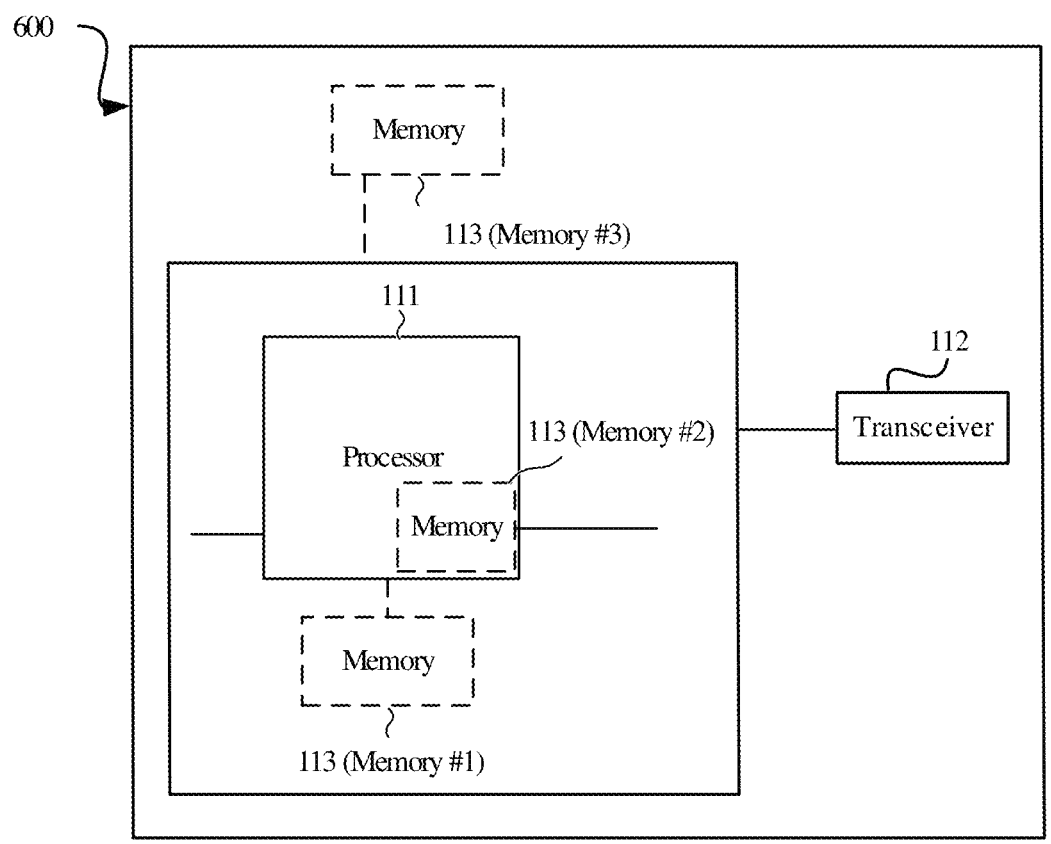
FIG. 6 is a schematic diagram of a hardware structure of a communication apparatus according to an embodiment of this application.

FIG. 6 is a schematic diagram of a hardware structure of a communication apparatus according to an embodiment of this application. For a structure of an AUSF device or an AMF/SEAF, refer to the structure shown in FIG. 6. The communication apparatus 600 includes a processor 111 and a transceiver 112. The processor 111 is electrically coupled to the transceiver 112.

The processor 111 is configured to execute a part or all of computer program instructions in the memory, and when the part or all of the computer program instructions are executed, the apparatus is enabled to perform the method in any one of the foregoing embodiments.

The transceiver 112 is configured to communicate with another device, for example, obtain a fourth message from the AUSF, and send a fifth message to UE based on the fourth message, so that the UE obtains the KID and/or the KAKMA based on the fifth message.

Optionally, the apparatus further includes a memory 113, configured to store computer program instructions. Optionally, the memory 113 (Memory #1) is disposed in the apparatus, the memory 113 (Memory #2) is integrated with the processor 111, or the memory 113 (Memory #3) is disposed outside the apparatus.

It should be understood that the communication apparatus 600 shown in FIG. 6 may be a chip or a circuit, for example, a chip or a circuit that may be disposed in the terminal apparatus or the communication apparatus. Alternatively, the transceiver 112 may be a communication interface. The transceiver includes a receiver and a transmitter. Further, the communication apparatus 600 may include a bus system.

The processor 111, the memory 113, and the transceiver 112 are connected through the bus system. The processor 111 is configured to execute the instructions stored in the memory 113, to control the transceiver to receive a signal and send a signal, to complete the steps of the first device or the second device in the implementation method in this application. The memory 113 may be integrated into the processor 111, or may be disposed separated from the processor 111.

In an implementation, it may be considered that functions of the transceiver 112 are implemented by using a transceiver circuit or a dedicated transceiver chip. It may be considered that the processor 111 is implemented by using a dedicated processing chip, a processing circuit, a processor, or a general-purpose chip. The processor may be a central processing unit (central processing unit, CPU), a network processor (network processor, NP), or a combination of the CPU and the NP. The processor may further include a hardware chip or another general-purpose processor. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field programmable gate array (field programmable gate array, FPGA), a generic array logic (generic array logic, GAL) and another programmable logic device, a discrete gate or a transistor logic device, a discrete hardware component, or the like, or any combination thereof. The general-purpose processor may be a microprocessor, or the processor may be any conventional processor or the like.

It may be understood that the memory mentioned in embodiments of this application may be a volatile memory or a nonvolatile memory, or may include a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. Through example but not limitative descriptions, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory described in this application is intended to include but is not limited to these memories and any memory of another proper type.

An embodiment of this application provides a computer storage medium. The computer storage medium stores a computer program, and the computer program includes instructions used to perform the method corresponding to the AUSF device in the foregoing embodiment.

An embodiment of this application provides a computer storage medium, storing a computer program. The computer program is used to perform the method corresponding to the AMF/SEAF device in the foregoing embodiments.

An embodiment of this application provides a computer program product including instructions. When the computer program product runs on a computer, the computer is enabled to perform the method corresponding to the AUSF device in the foregoing embodiment.

An embodiment of this application provides a computer program product including instructions. When the computer program product runs on a computer, the computer is enabled to perform the method corresponding to the AMF/SEAF device in the foregoing embodiments.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Apart or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method of dynamically triggering instantiation of an edge application server, wherein the method comprises:
    receiving, by an apparatus, a discovery request from an edge enabler client or a first edge enabler server, wherein
        the discovery request is for requesting information about an edge application server of an application, and
    the apparatus is a second edge enabler server or a chip for the second edge enabler server;
    determining, by the apparatus, that no edge application server of the application is instantiated or available;
    requesting, by the apparatus and based on the discovery request, an application instantiation management function entity device to instantiate the edge application server of the application;
    sending, by the apparatus, a response to the edge enabler client or the first edge enabler server, wherein the response indicates an instantiation of the edge application server of the application is in progress;
    receiving, by the apparatus, a notification message from the application instantiation management function entity device, wherein the notification message indicates that the edge application server of the application is instantiated; and
    sending, by the apparatus, information about the instantiated edge application server of the application to the edge enabler client or the first edge enabler server.

2. The method according to claim 1, wherein the requesting to instantiate the edge application server of the application comprises:
    requesting the application instantiation management function entity device to instantiate the edge application server of the application in an edge data network corresponding to the second edge enabler server.

3. The method according to claim 1, wherein the method further comprises:
    sending, by the edge enabler client or the first edge enabler server, the discovery request; and
    receivinig, by the edge enabler client or the first edge enabler server, the response and the information about the instantiated edge application server of the application.

4. The method according to claim 1, wherein the notification message comprises:
    the information about the instantiated edge application server of the application.

5. The method according to claim 1, wherein the requesting the application instantiation management function entity device to instantiate the edge application server of the application comprises:
    sending requirement information to the application instantiation management function entity device, wherein the requirement information comprises at least one of the following:
    at least one piece of candidate location information, wherein the candidate location information indicates an edge data network for instantiating the edge application server of the application, deployment mode information, information about a required resource, information about a required key communication indicator, a dependent service or application, or whether context transfer is supported.

6. The method according to claim 1, wherein before the requesting to instantiate the edge application server of the application, the method further comprises:
    determining, by the apparatus, that the edge application server of the application is able to be dynamically instantiated.

7. A communication apparatus, wherein the communication apparatus is a second edge enabler server or a chip for the second edge enabler server, and the communication apparatus comprises at least one processor, the at least one processor is coupled to at least one memory, and the at least one processor is configured to execute a computer program or instructions stored in the at least one memory, to enable the communication apparatus to perform:
    receiving a discovery request from an edge enabler client or a first edge enabler server, wherein
        the discovery request is for requesting information about an edge application server of an application;
    determining that no edge application server of the application is instantiated or available;
    requesting, based on the discovery request, an application instantiation management function entity device to instantiate the edge application server of the application;
    sending a response to the edge enabler client or the first edge enabler server, wherein the response indicates an instantiation of the edge application server of the application is in progress;
    receiving a notification message from the application instantiation management function entity device, wherein the notification message indicates that the edge application server of the application is instantiated; and
    sending information about the instantiated edge application server of the application to the edge enabler client or the first edge enabler server.

8. The communication apparatus according to claim 7, wherein the requesting to instantiate the edge application server of the application comprises:
    requesting the application instantiation management function entity device to instantiate the edge application server of the application in an edge data network corresponding to the second edge enabler server.

9. The communication apparatus according to claim 7, wherein the requesting the application instantiation management function entity device to instantiate the edge application server of the application comprises:
    sending requirement information to the application instantiation management function entity device, wherein the requirement information comprises at least one of the following:
    at least one piece of candidate location information, wherein the candidate location information indicates an edge data network for instantiating the edge application server of the application, deployment mode information, information about a required resource, information about a required key communication indicator, a dependent service or application, or whether context transfer is supported.

10. The communication apparatus according to claim 7, wherein the at least one processor is configured to execute the computer program or the instructions to enable the communication apparatus to further perform:

before the requesting to instantiate the edge application server of the application, determining that the edge application server of the application is able to be dynamically instantiated.

11. The communication apparatus according to claim 7, wherein the notification message comprises:
the information about the instantiated edge application server of the application.

12. A communication system, comprising:
a first device, wherein the first device is a second edge enabler server or a chip for the second edge enabler server; and
an edge enabler client or a first edge enabler server,
wherein the first device is configured to:
receive a discovery request from the edge enabler client or the first edge enabler server, wherein the discovery request is for requesting information about an edge application server of an application;
determine that no edge application server of the application is instantiated or available;
request, based on the discovery request, an application instantiation management function entity device to instantiate the edge application server of the application;
send a response to the edge enabler client or the first edge enabler server, wherein the response indicates an instantiation of the edge application server of the application is in progress;
receive a notification message from the application instantiation management function entity device, wherein the notification message indicates that the edge application server of the application is instantiated; and
send information about the instantiated edge application server of the application to the edge enabler client or the first edge enabler server; and
wherein the edge enabler client or the first edge enabler server is configured to: send the discovery request to the first device, receive the response and receive the information about the instantiated edge application server of the application.

13. The communication system according to claim 12, wherein the first device is configured to:
request the application instantiation management function entity device to instantiate the edge application server of the application in an edge data network corresponding to the second edge enabler server.

14. The communication system according to claim 12, wherein
the notification message comprises the information about the instantiated edge application server of the application.

15. The communication system according to claim 12, wherein the requesting the application instantiation management function entity device to instantiate the edge application server of the application comprises: sending the application instantiation management function entity device a request to instantiate the edge application server of the application; and
the communication system further comprises:
the application instantiation management function entity device configured to, in response to the request from the first device, instantiate the edge application server of the application; and send the notification message to the first device.

16. The communication system according to claim 15, wherein the request to instantiate the edge application server of the application comprises requirement information, wherein the requirement information comprises at least one of the following:
at least one piece of candidate location information, wherein the candidate location information indicates an edge data network for instantiating the edge application server of the application, deployment mode information, information about a required resource, information about a required key communication indicator, a dependent service or application, or whether context transfer is supported.

17. The communication system according to claim 12, wherein the first device is further configured to:
before requesting to instantiate the edge application server of the application, determine that the edge application server of the application is able to be dynamically instantiated.

* * * * *